United States Patent [19]

Hisada et al.

[11] Patent Number: 5,022,088
[45] Date of Patent: Jun. 4, 1991

[54] IMAGE PROCESSING APPARATUS WITH PROVISION FOR MEMORY OPERATION

[75] Inventors: Katsutoshi Hisada, Tokyo; Hiroshi Nobuta, Yokohama, both of Japan

[73] Assignee: Canon Kabushiki Kaisha, Tokyo, Japan

[21] Appl. No.: 581,205

[22] Filed: Sep. 10, 1990

Related U.S. Application Data

[63] Continuation of Ser. No. 477,121, Feb. 7, 1990, abandoned, which is a continuation of Ser. No. 089,055, Aug. 24, 1987, abandoned, which is a continuation of Ser. No. 610,752, May 16, 1984, abandoned.

[30] Foreign Application Priority Data

May 24, 1983 [JP] Japan .................. 58-90897
May 25, 1983 [JP] Japan .................. 58-91969

[51] Int. Cl.$^5$ ............................. G04K 9/36
[52] U.S. Cl. ................. 382/41; 358/426; 358/443; 382/56
[58] Field of Search ............ 382/41, 44, 56; 358/443, 470, 471, 426, 444; 364/134; 365/189, 195

[56] References Cited

U.S. PATENT DOCUMENTS

| 3,800,080 | 3/1974 | Fuwa | 358/280 |
| 4,302,775 | 11/1981 | Widergren et al. | 382/56 |
| 4,357,638 | 11/1982 | Yoshimaru et al. | 360/74.2 |
| 4,410,916 | 10/1953 | Pratt et al. | 358/261 |
| 4,413,285 | 11/1983 | Anzai et al. | 358/260 |
| 4,441,208 | 4/1984 | Iida | 382/56 |
| 4,507,760 | 3/1985 | Fraser | 364/134 |
| 4,646,160 | 2/1987 | Iizuka | 358/280 |

FOREIGN PATENT DOCUMENTS

| 117871 | 3/1984 | European Pat. Off. |  |
| 2348452 | 4/1975 | Fed. Rep. of Germany . |  |
| 3039902 | 5/1981 | Fed. Rep. of Germany . |  |
| 3137903 | 6/1982 | Fed. Rep. of Germany . |  |
| 57-81766 | 5/1982 | Japan . |  |
| 58-212252 | 9/1983 | Japan | 358/263 |
| 1096675 | 6/1984 | U.S.S.R. | 382/56 |
| 1479774 | 7/1977 | United Kingdom . |  |

OTHER PUBLICATIONS

Jones et al., "Image Compression by the Incremental Generation of Contours", IBM Tech. Disc. Bulletin, vol. 22, No. 7, Dec. 1979, pp. 2909-2912.

Primary Examiner—David K. Moore
Assistant Examiner—Joseph Mancuso
Attorney, Agent, or Firm—Fitzpatrick, Cella Harper & Scinto

[57] ABSTRACT

There is disclosed an image processing apparatus for electrically handling image information, particularly in compressed form, in which the efficiency of memory utilization is improved by storing information of plural pages in successive manner in a memory. Provision is made for ensuring that, if insufficient space is left in the memory for storage of another page of compressed image data, reading of the page in question is interrupted. Once there is again sufficient availability in the memory, the page is re-read, and the read data is compressed and stored.

20 Claims, 15 Drawing Sheets

| FIG. 2A |
| FIG. 2B |

| FIG. 11A | FIG. 11B |

FIG. 3A

MPX P34 SELECTION TABLE (SLB=X+Y−8)

| SLB | REG B INPUT | | | | | | | | | | | |
|---|---|---|---|---|---|---|---|---|---|---|---|---|
| | $a_0$ | $a_1$ | $a_2$ | $a_3$ | $a_4$ | $a_5$ | $a_6$ | $a_7$ | $a_8$ | $a_9$ | $a_{10}$ | $a_{11}$ |
| 0 | $b_8$ | $b_9$ | $b_{10}$ | $b_{11}$ | $b_{12}$ | × | × | × | × | × | × | × |
| 1 | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ |
| 2 | $b_2$ | $b_3$ | $b_4$ | $b_5$ | $b_6$ | $b_7$ | $b_8$ | $b_9$ | $b_{10}$ | $b_{11}$ | $b_{12}$ | × |
| 3 | $b_3$ | $b_4$ | $b_5$ | $b_6$ | $b_7$ | $b_8$ | $b_9$ | $b_{10}$ | $b_{11}$ | $b_{12}$ | × | × |
| 4 | $b_4$ | $b_5$ | $b_6$ | $b_7$ | $b_8$ | $b_9$ | $b_{10}$ | $b_{11}$ | $b_{12}$ | × | × | × |
| 5 | $b_5$ | $b_6$ | $b_7$ | $b_8$ | $b_9$ | $b_{10}$ | $b_{11}$ | $b_{12}$ | × | × | × | × |
| 6 | $b_6$ | $b_7$ | $b_8$ | $b_9$ | $b_{10}$ | $b_{11}$ | $b_{12}$ | × | × | × | × | × |
| 7 | $b_7$ | $b_8$ | $b_9$ | $b_{10}$ | $b_{11}$ | $b_{12}$ | × | × | × | × | × | × |

FIG. 3B

MPX Q35 SELECTION TABLE (SLC=Y)

| SLC | REG C INPUT | | | | | | | |
|---|---|---|---|---|---|---|---|---|
| | $c_0$ | $c_1$ | $c_2$ | $c_3$ | $c_4$ | $c_5$ | $c_6$ | $c_7$ |
| 0 | $b_0$ | $b_1$ | $b_2$ | $b_3$ | $b_4$ | $b_5$ | $b_6$ | $b_7$ |
| 1 | $c_0$ | $b_0$ | $b_1$ | $b_2$ | $b_3$ | $b_4$ | $b_5$ | $b_6$ |
| 2 | $c_0$ | $c_1$ | $b_0$ | $b_1$ | $b_2$ | $b_3$ | $b_4$ | $b_5$ |
| 3 | $c_0$ | $c_1$ | $c_2$ | $b_0$ | $b_1$ | $b_2$ | $b_3$ | $b_4$ |
| 4 | $c_0$ | $c_1$ | $c_2$ | $c_3$ | $b_0$ | $b_1$ | $b_2$ | $b_3$ |
| 5 | $c_0$ | $c_1$ | $c_2$ | $c_3$ | $c_4$ | $b_0$ | $b_1$ | $b_2$ |
| 6 | $c_0$ | $c_1$ | $c_2$ | $c_3$ | $c_4$ | $c_5$ | $b_0$ | $b_1$ |
| 7 | $c_0$ | $c_1$ | $c_2$ | $c_3$ | $c_4$ | $c_5$ | $c_6$ | $b_0$ |

IMAGE PROCESSING APPARATUS WITH PROVISION FOR MEMORY OPERATION

This application is a continuation of application Ser. No. 07/477,121, filed Feb. 7, 1990, which was a continuation of application Ser. No. 07/089,055, filed Aug. 24, 1987, which was a continuation of application Ser. No. 06/610,752, filed May 16, 1984 all now abandoned.

BACKGROUND OF THE INVENTION

1. Field of the Invention

The present invention relates to an apparatus for electrically processing image information such as an image file or a facsimile apparatus, and more particularly to such image processing apparatus adapted for processing image information in compressed form, for example image information stored or transmitted in the run-length encoded form using the modified Huffman (M-H) codes.

2. Description of the Prior Art

It has been proposed to read an original image photoelectrically to generate electric image signals, and to transmit such signals to a printer or a file, or to a distant printer apparatus through a transmission line. In the case of such image signal transmission among plural units, satisfactory synchronization is indispensable between the transmitting and receiving units. However, satisfactory image signal transmission cannot be expected by mere synchronization if the signal processing speed is different between the different units.

Accordingly, there has been considered adjustment the speed or timing of transmission by providing at least either one of the transmitting and receiving units, for example a reader and a printer, with a buffer memory and storing the image signals to be transmitted in such buffer memory.

Such a buffer memory requires a certain margin in memory capacity in order to ensure satisfactory synchronization. However an increase in the memory capacity is inevitably limited as it leads to an increase in the cost.

Also in the case that a compression process is involved in the image data handling, the quantity of data after compression varies significantly, so that the number of pages that can be stored in a memory fluctuates according to the case. At the transmission of compressed image data, certain other signals such as timing signals are transmitted simultaneously, and the storage of such other signals into the aforementioned memory gives rise to waste of the memory capacity.

SUMMARY OF THE INVENTION

In consideration of the foregoing, an object of the present invention is to provide an image processing apparatus capable of satisfactorily and efficiently processing image data.

Another object of the present invention is to provide an image processing apparatus capable of efficiently utilizing a memory for transmission or reception of image data.

Still another object of the present invention is to provide an image processing apparatus adapted for handling compressed image data.

Still another object of the present invention is to provide an image processing apparatus sufficiently adaptable to high-speed image processing.

Still another object of the present invention is to provide an image processing apparatus adapted for processing data compressed by the modified Huffman encoding.

The foregoing and still other objects of the present invention and the advantages resulting therefrom will become fully apparent from the following description.

BRIEF DESCRIPTION OF THE DRAWINGS

FIGS. 3A and 3B are charts showing input-output relationship of the circuit shown in FIG. 2;

DETAILED DESCRIPTION OF THE PREFERRED EMBODIMENTS

Now the present invention will be clarified in detail by embodiments thereof shown in the attached drawings.

Figure 1:
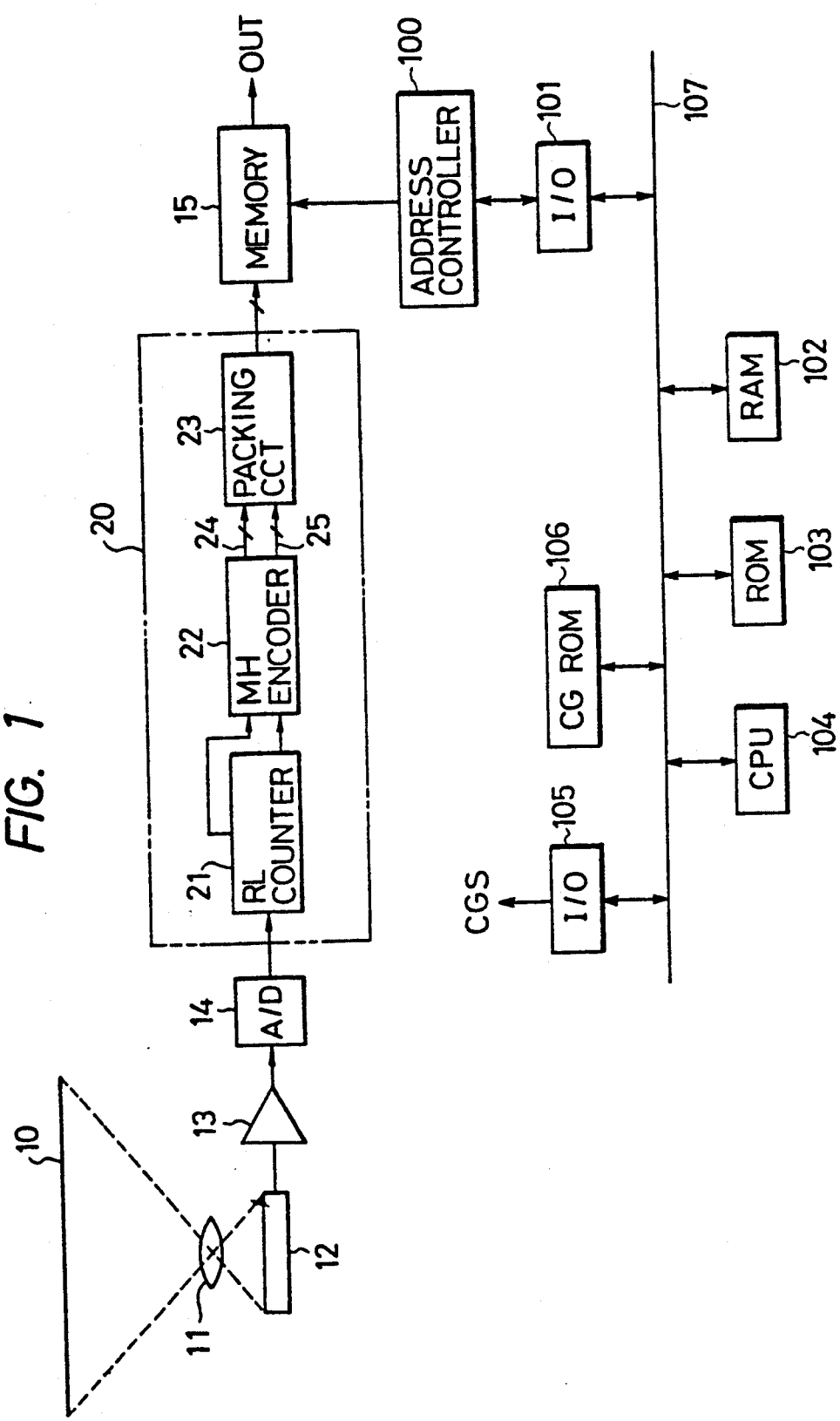
FIG. 1 is a block diagram showing an embodiment of an original reading unit with data compression capability.

FIG. 1 shows the structure of an embodiment of an original image reading unit, wherein an original document 10 is illuminated by an unrepresented light source, and the reflected light is focused, by a lens 11, onto an image sensor 12 composed of a charge-coupled device. The image sensor 12 comprises an array of plural photoelectric converting elements arranged in the transversal direction of the original document, and generates serial electric signals for each line corresponding to the intensity of the incident light. The image sensor 12 and the original document 10 are continuously moved with respect to each other at a determined speed by an unrepresented driving mechanism in a direction substantially perpendicular to the scanning direction of the image sensor 12, whereby the image sensor 12 photoelectrically reads the entire area of the original document 10, thus generating electric signals corresponding to the image density of the original document 10.

The output signals from the image sensor 12 are amplified in an amplifier 13, and are then converted, in an A/D converter 14, into binary image signals representing black and white levels, at a suitable sampling frequency. The binary signals from the A/D converter 14 are supplied to a data compression circuit 20, in which a run-length (R-L) counter 21 counts the consecutive number of white and black levels in the input binary signals. A modified Huffman (M-H) encoder 22 receives said count and a signal indicating white or black state, and supplies, according to the known conversion table, M-H codes 25 and data 24 indicating the code length of said M-H codes to a packing circuit 23. Utilizing said code length data 24, the packing circuit 23 connects the M-H codes 25 of varying code lengths to sequentially release data of a determined effective code length, for example 8 bits. The sequential data from the data compression circuit 20 are released as serial continuous signals through a memory board 15 functioning as a buffer memory. Said memory board 15 has a capacity of 32 Mbytes, composed of 512 memory chips of 64 Kbytes. The output signals thus obtained are for example stored in a file unit such as an optical disk, or transmitted to a distant location through a telephone line. In this manner it is rendered possible to achieve high speed data filing in a small-capacity disk and/or reduction of transmission time.

In FIG. 1 there is provided an address control circuit 100 for controlling the data write-in and read-out of the memory board 15, and the corresponding address data are stored in a RAM 102. There are provided various address data as will be explained later, and utilized for controlling the address control circuit 100 through a CPU 104 and an input/output port (I/0) 101. A character generator CGROM 106 is a memory for generating characters by software for inscribing date and time in the image data, and supplies output signals through I/O 105 to an R-L counter 21 (see FIG. 2). In this manner the characters are also synthesized in the form of M-H codes.

The central processing unit (CPU) 104 is composed of a microcomputer for controlling the above-mentioned components, and is provided with a clock function for displaying date and time. A read-only memory (ROM) 103 stores the control program for the CPU 104.

The I/O's 101, 105, RAM 102, ROM 103, CPU 104 and CGROM 106 are connected to a bus line 107.

Figures 2, 2A:
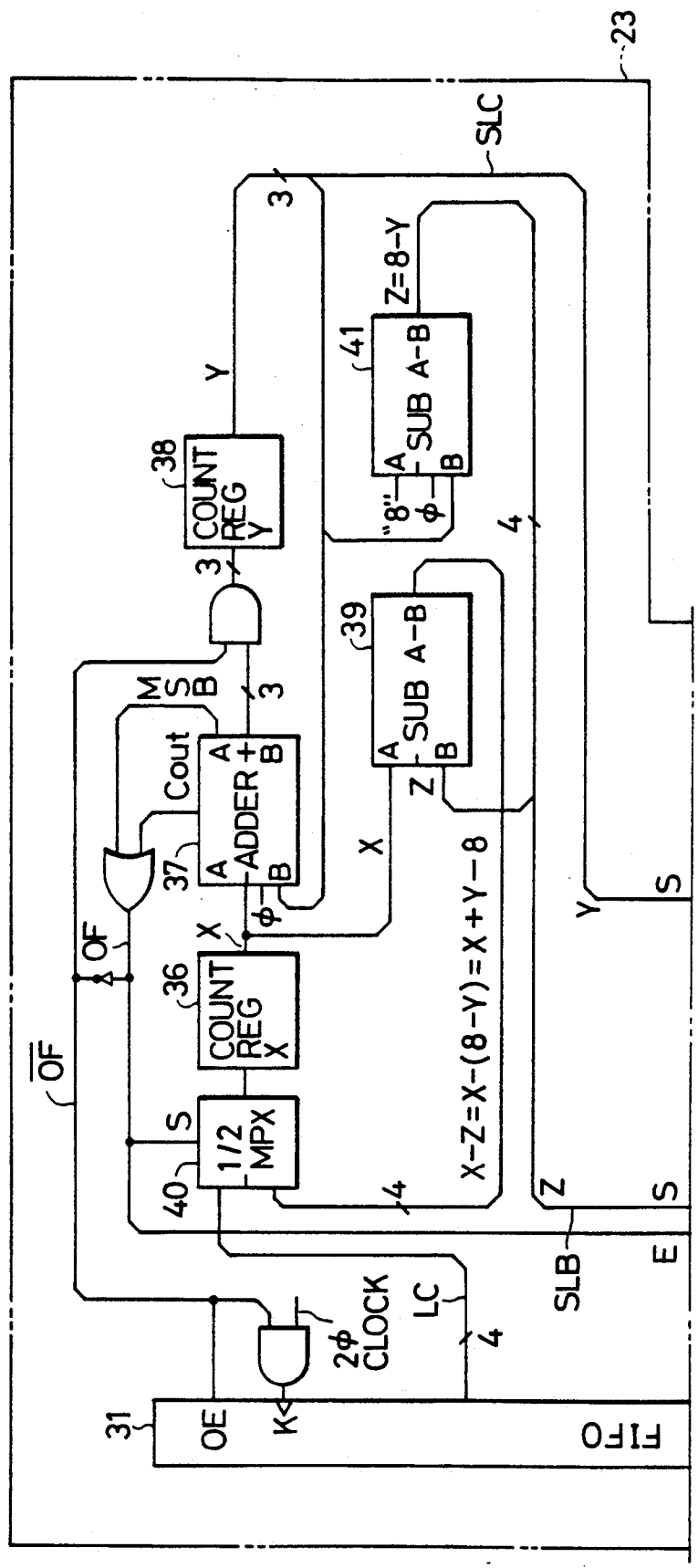
FIG. 2, composed of FIGS. 2A and 2B, is a circuit diagram showing a detailed example of a data compression circuit 20 shown in FIG. 1.
Figure 2B:
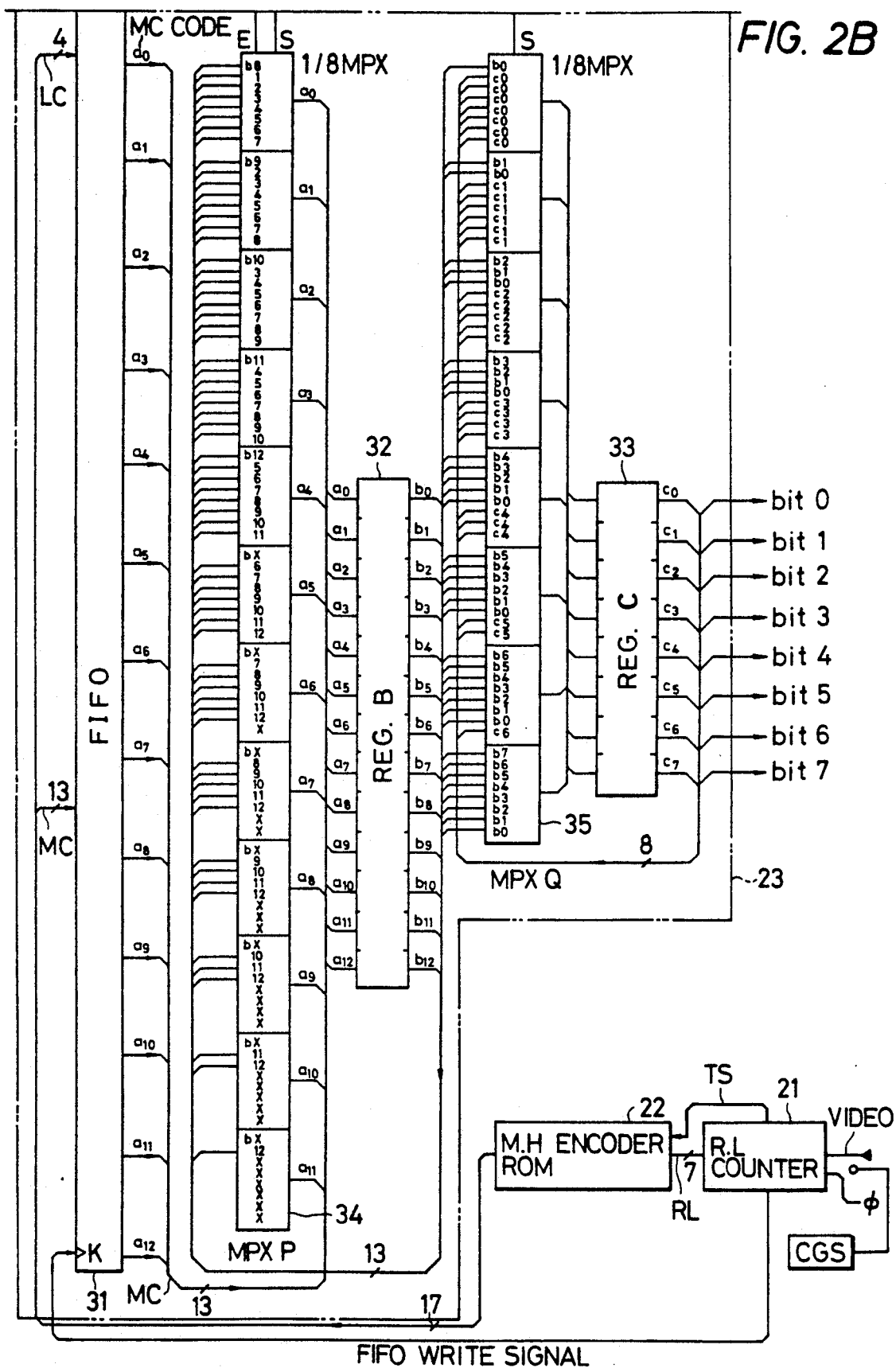

FIG. 2 shows an embodiment of the data compression circuit 20 shown in FIG. 1, in more detail. Said circuit is designed, as explained before, to convert serial image data into modified Huffman (M-H) codes, and to pack the modified Huffman codes of varying lengths for obtaining parallel data of a determined effective length, namely 1 byte in this case, for supply to an electronic file or the like.

Binary serial digital data VIDEO, obtained by reading an original and indicating the image density thereof, are supplied to run-length (R-L) counter 21 for determining the run length, namely the number of consecutive black or white pixels. At the same time there is discriminated whether the input signals subjected to run-length counting indicate black or white. A run-length signal RL thus determined and a signal TS indicating black or white status are supplied to address lines of an M-H encoder 22 composed of a ROM storing a modified Huffman code conversion table. The M-H encoder 22 converts the signals RL and TS into M-H codes of 13 bits at maximum, and simultaneously generates, in parallel manner, 4-bit signals indicating the effective code length thereof. As an example, in case the M-H code is "001138, the M-H code conversion table releases an M-H code MC 0011XXXXXXXXX (X is arbitrary) and a code length signal LC "4" ("0100").

The M-H code MC and the effective code length signal LC generated in the above-described manner are supplied, in parallel manner, to the packing circuit 23 and temporarily stored in a first-in-first-out (FIFO) buffer memory 31.

The above-described function of the R-L counter 21, M-H encoder 22 and FIFO memory 31 is conducted on real-time basis in synchronization with the transfer rate $\phi$ of the original image data VIDEO, namely for example in synchronization with the image reading operation at a determined speed.

Then the M-H codes MC and the effective code length signals LC are read from the FIFO memory 31 and are subjected to a bit handling process for jointing the M-H codes.

In consideration of the data expansion by the M-H conversion, the data read-out from the FIFO memory and the bit handling process are conducted at a speed equal to or higher than twice of the transfer rate of the original image data VIDEO, and it is selected to be equal to twice, or $2\phi$, in the present embodiment. An excessively high speed is unnecessary since for data processing has to wait the data supply.

The M-H code MC of 13 parallel bits at maximum taken out from the FIFO memory 31 is transferred in succession from a 13-bit- register B32 to an 8-bit register C33 and finally packed into 8 bits or 1 byte. However, the M-H codes MC have to be subjected to a bit handling process because they have varying code lengths according to the run length, and such process is conducted by two ½ multiplexers P (MPXP) 34 and Q (MPXQ) 35. In the multiplexer P34, the marks X at the input ports indicate unused ports.

The multiplexer Q35 has a function of packing, into the lower bits of an M-H code stored in the register C33, a succeeding M-H code MC stored in the register B32.

On the other hand the multiplexer P34 has a function of shifting the bits of the register B32 upwards by a number equal to the number of bits packed into the register C33 from the register B32.

The effective code length signal LC is supplied, through a multiplexer 40, into a count register X36, and is cumulatively added by an adding circuit 37 and a count register Y38. The result of said addition is utilized for discriminating the number of bits packed in the register C33.

A multiplexer Q35 is used to indicate, in response to a signal SLC representing the content of the count register Y38, the number of lower bits of the register C33 into which the data are to be transferred from the register B32.

Since the register C33 has a limited number of bits (8 bits in the present embodiment), all the data bits stored in the register B32 may not be transferable into the register C33, with a resulting overflow. In such case the remaining data bits which cannot be transferred into the register C33 remain in the register B32. The number of such remaining bits is calculated by a subtracting circuit 39 receiving the content of the count register X36 and that of a subtracting circuit 41, and is reset in the count register X36 through a multiplexer 40 which is activated by a carry-out signal from the adding circuit 37 or by an overflow signal OF from the most significant bit. In this manner there is reached a state the same as when the data bits are newly set into the register B32 from the FIFO memory 31.

In the above-mentioned case, it becomes necessary to shift the remaining data bits in the register B32 toward the upper digits by a number of bits transferred to the register C33. Said number is calculated by the subtracting circuit 41 receiving the number of effective bits (8 bits) and the content of the count register Y38 and is supplied as a selecting signal SLB for the multiplexer P34 which is enabled by the overflow signal OF, thereby effecting the upward shift of the remaining bits in the register B32.

The multiplexer P34 is activated only at the overflow of the register C33. Consequently, in the absence of the overflow of the register C33, the M-H code data MC are simply transferred from the FIFO memory 31 to the register B32, and then to the register C33 by means of shifting by the multiplexer Q35.

In the presence of overflow in the register C33, the code data read-out from the FIFO memory 31 is stopped by an inverted signal $\overline{OF}$ of the overflow signal OF, but the bit handling processing is continued. More specifically the remaining bits in the register B32 are transferred upwards by the multiplexer P34, and, at the same time, a part of the bits of the register B32 is transferred into the lower bits of the register C33. Thus the register C33 is completely filled with the data of 1 byte. The cumulatively added value in the count register Y38 is cleared by the over-signal OF, since the register C33 starts the data storage anew from the empty state after the overflow of the register C33.

Also the FIFO memory 31 may release a buffer "empty" signal in case the bit jointing process overtakes the supply of the image data. In such case the bit jointing process is temporarily interrupted.

Figure 4:
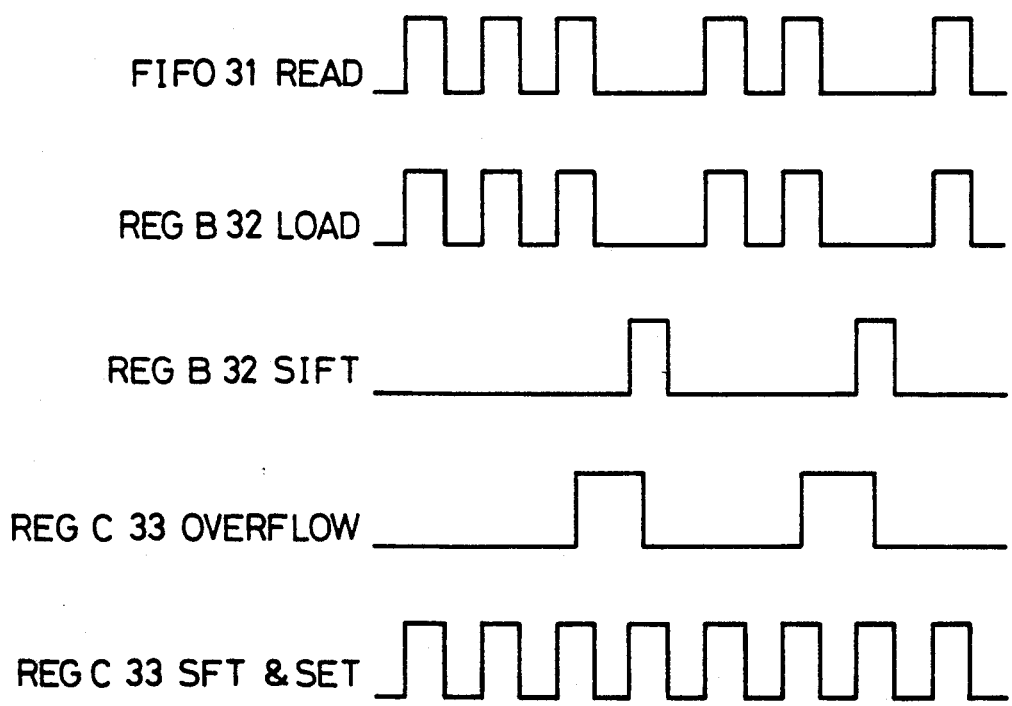
FIG. 4 is a timing chart showing the function of the circuit shown in FIG. 2.

FIG. 3A shows the input-output relationship of the multiplexer P34 and the register B32, and FIG. 3B shows that of the multiplexer Q35 and the H) register C33. Also FIG. 4 shows the timing chart of the functions of the FIFO memory 31, register B32 and register C33.

As explained above, the code data MC stored in the FIFO memory 31 are subjected, in succession, to the data packing into the register C33 and the data storage, including data shift, in the register B32. Said shifting is not conducted in the absence of remaining data in the register B32. Also by employing a doubled speed $2\phi$ for said packing and shifting operations with respect to the transfer rate $\phi$ of the original image data VIDEO into the R-L counter 21, it is rendered possible to achieve a high-speed real-time processing without interrupting the original image reading, while allowing the circuits to cope with the data expansion resulting from the M-H conversion.

Thus, the M-H codes of varying code lengths supplied in succession from the M-H encoder 22 are supplied to the FIFO memory 31, and are thereafter handled as parallel data for reducing the time required for the bit jointing process. It is therefore rendered possible to achieve the data compression on a real-time basis without limiting the image reading operation in response to the data processing speed. Consequently the image reading operation need not be conducted in intermittent manner but can be conducted continuously at a high speed.

In the foregoing embodiment the M-H code data are packed in the unit of one byte, but there may be employed other packing units such as one word or several bytes according to the specification of a succeeding unit such as an electronic file or of the data transmission. In such a case there should naturally be employed multiplexers suitable for such packing units, but the bit packing operation by the multiplexer Q35 and the bit shifting operation by the multiplexer P34 are applicable also in such a case by means of a similar circuit structure.

Also the data processing speed may be selected to be higher than twice of the data supply speed.

Furthermore the above-described packing process is applicable not only to the M-H converted image data but also to various data of varying data lengths supplied from various data output devices, such as data compressed by other logics or data read from a semiconductor memory or a magnetic memory and converted according to a determined logic.

Now there will be given a detailed explanation of the memory board 15 shown in FIG. 1, which is utilized as a memory for storing encoded data and is effective for data transmission through a communication line. As explained in the foregoing, it has a memory capacity of 32 Mbytes, which can store data of about 16 pages of the original each having information of about 2 Mbytes. However, because of the characteristic of the M-H encoding, only 2 or 3 pages can be stored after compression if the original image contains a lot of characters or a dithertreated intermediate-tone image. On the other hand the same memory may be able to store 20 pages or more if the original image is simple. Thus the memory will be quite uneconomically utilized if a uniform an area for each page is predetermined in the memory.

The present embodiment avoids this drawback and enables efficient utilization of the memory.

In FIG. 1, there is provided an address circuit 100 for data write-in and read-out of the memory board 15, and the corresponding address data are stored in a RAM 102. As will be explained later, there are provided various address data, which control the address control circuit 100 through the CPU 104 and the I/0 101. A character generator CGROM 106 generating characters by software is used for synthesizing date and time with the image data, and supplies the output signals through an I/0 105 to the R-L counter 21. In this manner the characters are also M-H encoded for synthesis. The CPU 104 for the above-described control is composed of a microcomputer with clock function for displaying date and time.

Upon completion of the storage of image data of one page into the memory board 15, the address control circuit 100 stores the address data at that time in the RAM 102 as a stop address. Said address data are then set as a start address in the control circuit 100 for storing the image data of a second page. The storage is started from said start address when the compressed image data of the second data are supplied. On the other hand, the image data of the first page stored in the memory are released from the memory 15 for successive transmission during the storage of the image data of the second page. However, new data storage in the memory area for the data of the first page is prohibited until the read-out of said data of the first page is completed. Then the image data of a third page are stored in the same manner from a start address corresponding to the stop address for the data of the second page. In the case that the memory becomes full in the course of the image data storage for the third page, the data storage returns to the memory area for the first page only if the data transmission for the first page has been completed. On the other hand, if the data of the first page still remain in the memory, the image data storage is suspended until the image data read-out for the first page is completed.

Figure 5:
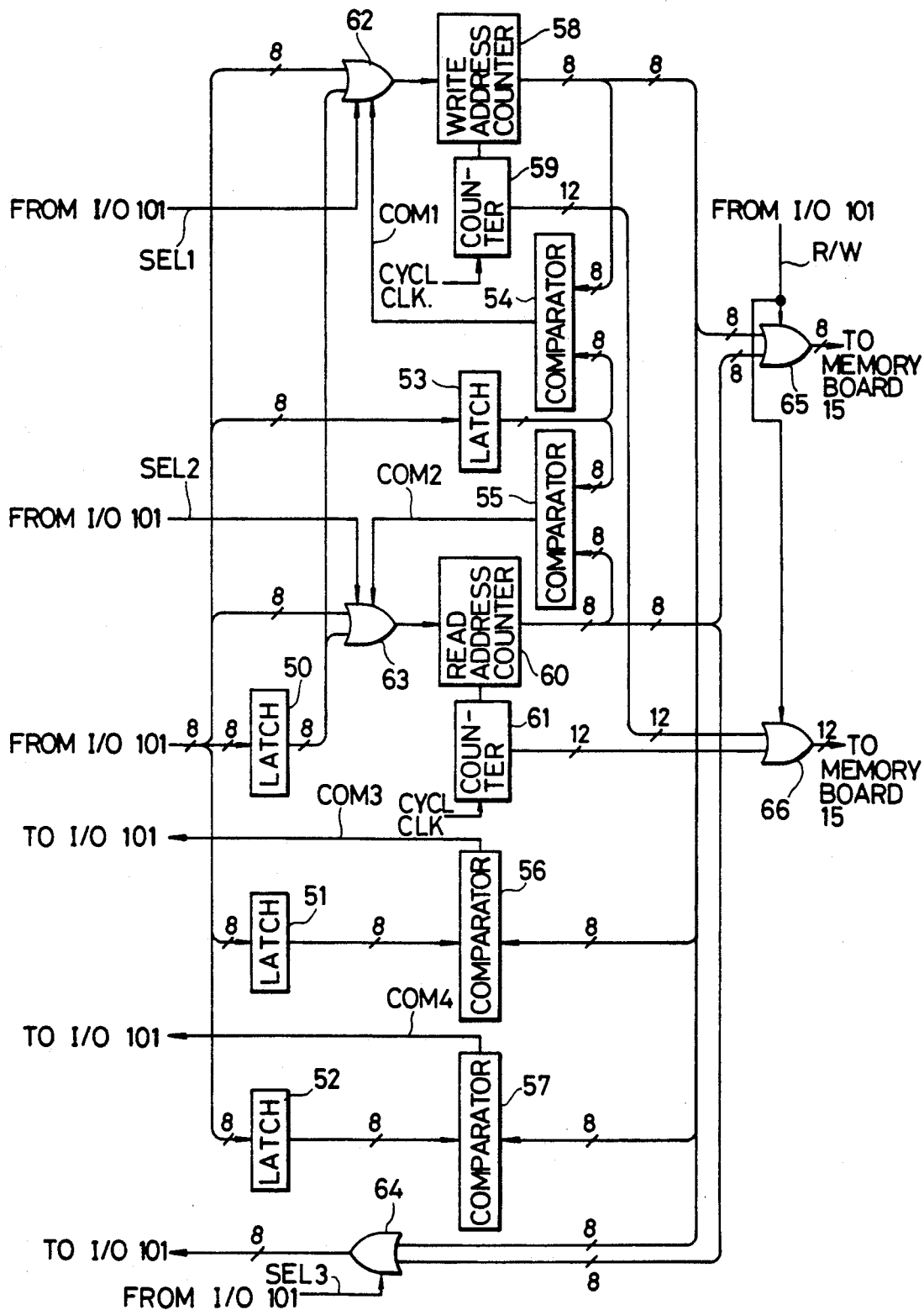
FIG. 5 is a circuit diagram showing a detailed example of an address controller shown in FIG. 1.

FIG. 5 is a circuit diagram of the address control circuit 100 shown in FIG. 1. As explained before, the address control circuit 100 is connected between the memory board 15 and the I/0 101 and effects data exchange with the CPU 104 through the I/0 101, thereby controlling the addresses for the image data write-in and read-out of the memory board 15.

There are provided latch circuits 50–53 for latching 8-bit parallel data from the CPU 104, wherein 50 is used for latching the turn-around address, 51 for the alarm generating address, 52 for the top address of the inhibited area, and 53 for the memory end address. The memory board 15 requires 20-bit data for address control, but said latches do not deal with such 20-bit data but with the upper 8 bits only, obtained by rounding up or down such 20-bit data, thus simplifying the structure of the address control circuit 100.

There are also provided 8-bit counters 58, 60 and 12-bit counters 59, 61. The counters 58 and 59 constitute a 20-bit write address counter for forming address data for the data write-in to the memory board 15. On the other hand the counters 60 and 61 constitute a 20-bit read address counter for forming address data for the data read-out from the memory board 15. Said write address counter and read address counter respectively count clock signals CYCL CLK synchronized with the data transmission involving the memory.

A selector 65 selects either the 8-bit count received from the write address counter 58 or that from the read address counter 60, according to a read/write selection signal R/W received from the CPU 104 through the I/0 101. Also a selector 66 selects either the 12-bit count received from the write address counter 59 or that from the read address counter 61 according to the read/write selection signal R/W in the same manner as the selector 65.

Said selecting operation of the selectors 65, 66 forms a 20-bit address for making access to the memory board 15, thus effecting read/write control thereof.

Comparator 54 or 55 respectively compares two 8-bit data and releases a coincidence signal COM1 or COM2 in the case of coincidence. The comparator 54 receives the count from the write address counter 58 and the memory end address latched in the latch 53, and releases the coincidence signal COM1 in the case that said count reaches the memory end address. The coincidence signal COM1 is supplied to a selector 62, which in response selects the turn-around address from the latch 50 and sets the same in the write address counter 58.

The comparator 55 receives the count from the read address counter 60 and the memory end address from the latch 53, and supplies the coincidence signal COM2 to the selector 63 when said count reaches the memory end address, whereby the selector 63 selects the turn-around address from the latch 50 and sets the same in the read address counter 60.

Comparator 56 or 57 respectively compares two 8-bit data and releases a coincidence signal COM3 or COM4 upon coincidence of the two. The comparator 56 receives the count from the write address counter 58 and the alarm generating address from the latch 51 and supplies the coincidence signal COM3 to the CPU 104 through the I/0 101 when said count reaches the alarm generating address.

Also the comparator 57 receives the count from the write address counter 58 and the inhibited area top address from the latch 52, and supplies the coincidence signal COM4 to the CPU 104 through the I/0 101 when said count reaches the inhibited area top address.

Selectors 62–66 respectively receive two 8-bit parallel data and select either thereof. The selector 62, used for selecting the count starting address of the write address counter 58, receives the write start address from the CPU 104 through the I/0 101 and the turn-around address latched in the latch 50, selects and sets either in the write address counter 58 according to a selection signal SEL1 from the CPU 104 and the coincidence signal COM1 from the comparator 54. The selector 63, having a similar function to that of the selector 62, selects either the read start address entered from the CPU 104 through the I/0 101 on the turn-around address latched in the latch 50 according to a selection signal SEL2 from the coincidence signal COM2 from the comparator 55 and sets the thus selected signal in the read address counter 60 as the count starting address.

The selector 64 selects either of 8-bit counts from the write address counter 58 and the read address counter 60 (corresponding to the upper 8 bits of the actual 20-bit address count) according to a selection signal SEL3 from the CPU 104. The address thus selected is transmitted, as the write current address or read current address, to the CPU 104 through the I/O 101.

TABLE 1

| Data write-in | | Data read-out | |
|---|---|---|---|
| Signal | Explanation | Signal | Explanation |
| Write start address ← CPU | Write start address is designated by CPU | Read start address ← CPU | Read start address is designated by CPU |
| Memory end address ← CPU | CPU detects the status of memory and designates the end address of a usable memory. At the data write-in, the circulating operation is started from said address. | Same as the data write-in | |
| Turn-around address ← CPU | A jumped address in case of circulating operation required for memory overflow etc. It is designated by | | |
| Inhibited area top address ← CPU | Top address of a fixed memory area in use in another operating mode. It is designated by CPU. | | |
| Alarm generating address → CPU | An address in case the remaining memory capacity effective for data write-in becomes 500 Kbits. It is designated by the memory board. | | |
| Write current address → CPU | The current write-in address can be sensed by CPU and can also be used as the stop address. | Read current address → CPU | The current read-out address can be sensed by CPU and can also be used as the stop address. |

Now reference is made to FIGS. 6 to 9 for explaining the memory control by the address control circuit 100 shown in FIG. 5. In these figures the top address and the end address of an area available for the image data write-in in the memory board 15 are respectively assumed to be (A) and (Z). Thus, in an initial state shown in FIG. 7, the write start address shown in Table 1 corresponds to (A), the memory end address to (Z), the turn-around address H) to (A), the inhibited area top address to (Z), and the read start address to (A).

Figure 7:
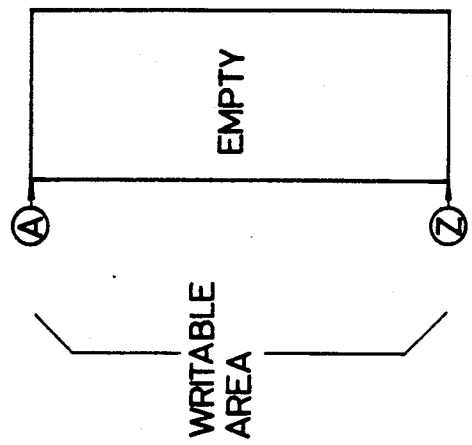
FIGS. 6 to 9 are charts showing the data write-in and read-out states of the memory.
Figure 6:
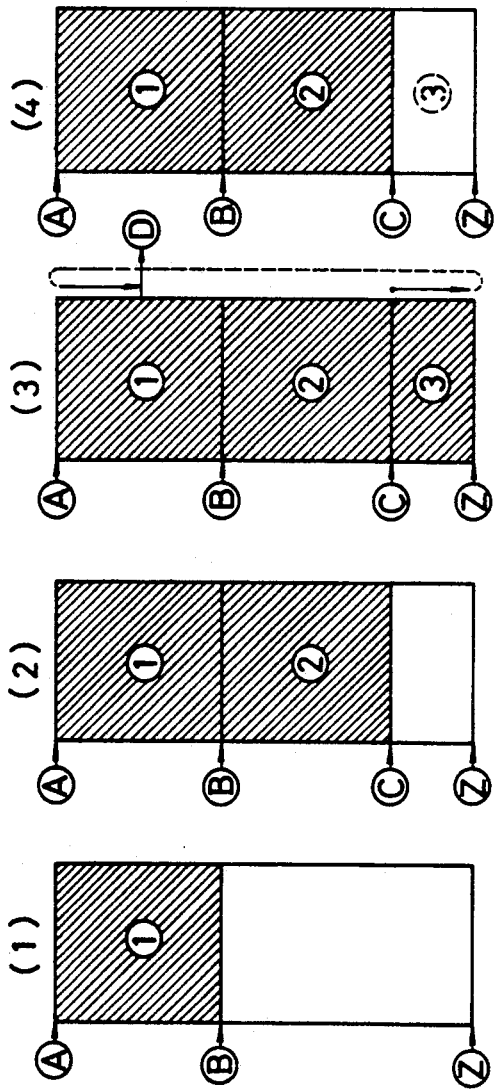

FIG. 6 shows the state of image storage in an empty memory shown in FIG. 7:

(1) At first the memory end address (Z), turnaround address (A) and alarm generating address are respectively set in the latches 53, 50, 51, then the write start address (A) is set in the write address counter 58, and the memory board is set to the write-in mode to start the reading of the original image. Thereafter the storage of the image data in the memory is conducted according to the counts of the write address counters 58, 59. When the reading of a first page (1) is completed so that all the data are M-H converted and the data RTC indicating the page end recorded, the counting operation of the write address counters 58, 59 is stopped to terminate the storage operation. In response to the recording of the data RTC, the CPU 104 reads the stopped memory address (current address) (B) from the read address counter 58 through the selector 64 and stores it in the RAM 102. Also the inhibited area top address (A) is set in the latch 52.

(2) As the write start address for a succeeding page, a value (B)+1 is set in the write address counter 58, where (B) is stored in the RAM 102, and the original image reading is started. When the storage of a second page (2) is completed, the CPU 104 reads the address (C) of the write address counter 58 at the stopped point and stores it in the RAM 102.

(3) As the write start address for a succeeding page, a value (C)+1 is set in the write address counter 58, and the reading of a third page (3) is started. When the distance to the inhibited area top address (A) reaches 500 Kbits, the comparator 56 supplies the coincidence signal COM4 as an alarm to the CPU 104. In the present storage mode, however, the CPU 104 does not carry out any step in communication such as CWC interruption to be explained later. Then, when the count of the write address counter 58 reaches the memory end address, the coincidence signal COM1 from the comparator 54 shifts the selector 62 to set the turn-around address (A) in the write address counter 58, thus advancing the current address. However, since the inhibited area top address stored in the latch 52 is (A), the actual data write-in to the memory is inhibited from the address (A). On the other hand, the address counting by the write address counter 58 is continued. Then, in response to the completion of reading of the third page (3), the CPU 104 stops the counting operation of the write address counter 58 and stores the stop address (D) thereof in the RAM 102. In this state the CPU 104 sets the page start address again to (C)+1 (more exactly, it does not set a new start address but clears the page (3) partially stored in the memory). In this manner the CPU 104 can know the quantity of information of the page (3) from the stop address (D) stored in the RAM 102. The reading of the original image of the page (3) is started again when the memory area for the page (1) is emptied after the transmitting (or test copying) operation is started.

(4) Finally, before the start of data read-out of the page (1), the storage operation is terminated with the write start address (C)+1, the memory end address (Z), the turn-around address (A), the inhibited area top address (A), and the read start address (A).

Figure 8:
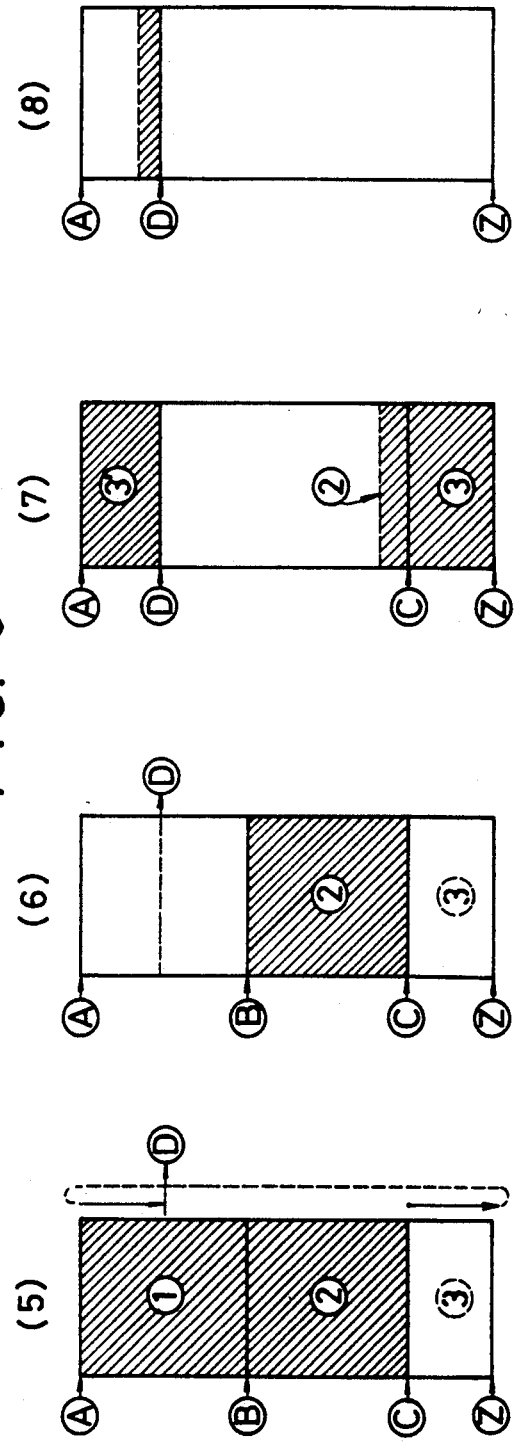

FIG. 8 shows a case of transmission in which three originals are manually changed (storage/transmission mode).

(5) A transmission button is actuated after the completion of storage of the image data of the pages (1) and (2) in the above-mentioned step (4). In this case the read start address (A) is set in the read address counter 60. In this state the CPU 104 has stored in the RAM 102 that the page (3) is to be stored up to the address (D) following the pages (1) and (2).

(6) The data are read from the memory starting from the top address (A) of the page (1) according to the counts of the read address counter 60, 61, and, when the entire page (1) is transmitted, the storage in the memory of the page (3), which was suspended as explained before, is started again from the address (C)+1. Also the read start address (B) is set in the read address counter 60, and the inhibited area top address to be stored in the latch 2 is shifted to (B). In this manner the image data storage beyond the address (B) is inhibited since the image data of the page (2) are stored.

(7) The page (3) is stored while the page (2) is read from the memory. The storage of the page (3) is completed at the address (D). Upon completion of transmission of the page (2), the read start address and the inhibited area top address are shifted to (c) corresponding to the start of the page (3). Upon completion of the storage of page (3), there is started the transmission of the page (3) according to the counts of the read address counters 60, 61.

(8) Upon completion of the transmission of page (3), the transmission is terminated and the read start address and the write start address are returned to (a) while the inhibited area top address is shifted to (Z), thus restoring the initial state shown in FIG. 7.

As explained above, the transmission is made not after the storage of a page but after the storage of plural pages. It is therefore rendered possible to economically avoid the unnecessary occupation of the communication line even if there is required a blank time for manually changing the originals. Also, time economization is achieved because the data storage into the memory and the data reading from the memory can be conducted in parallel manner.

Figure 9:
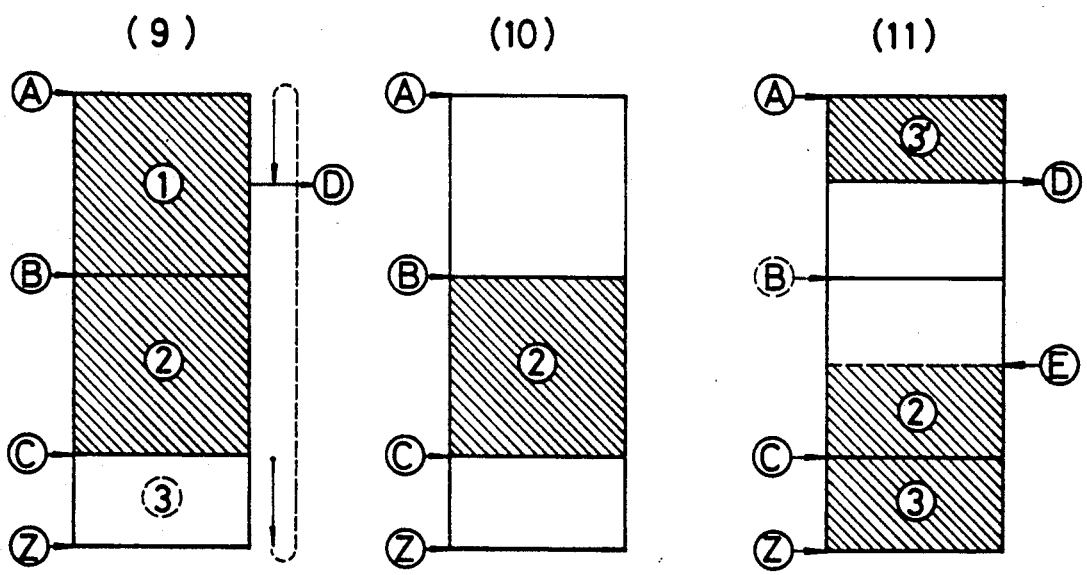

FIG. 9 shows a case in which the interruption of transmission is requested from the receiving unit in the course of transmission with original changing (storage/transmission mode).

(9) In this the image data of the pages (1) and (2) are stored in the memory as shown in (4) in FIG. 6. The storage of the page (3) is suspended because of memory overflow, but the CPU 104 stores in the RAM 102 that said storage will occupy the memory up to the address (D).

(10) The transmission of the page (1) is started, and, upon completion thereof, the storage of the page (3) is started simultaneously with the transmission of the page (2). The inhibited area top address is shifted to (B).

(11) In the course of the transmission of the page (2), a signal CWC, requesting to interrupt the image data transmission, is received from a receiving unit such as a printer or a disk. Said signal CWC is transmitted from the receiving unit to the sending unit in order to temporarily interrupt the transmission in case, for example, of the overflow of the receiving memory of the receiving unit, and a signal CRC is transmitted from said receiving unit to the sending unit to restart the transmission when said interruption is to be cancelled. In response the CPU 104 releases an instruction to interrupt the memory read-out, whereby the image data read-out of the page (2) is interrupted at an address (E). Said address (E) is read, from the read address counter 58, by the CPU 104 through the selector 64 and is stored in the RAM 102. On the other hand the storage of the page (3) is continued and is completed during said interruption. When the image data transmission is enabled by the signal CRC from the receiving unit, the readout operation is started again by setting a read start address (E) in the read address counter 60, thus reading the remainder of the page (2) from said address (E). The transmission is terminated upon completion of the transmission of the page (3).

The memory can be efficiently utilized in this manner, and, in case of automatic original changing requiring little time for the original changing, plural originals can be transmitted within a short period from the start of the original reading by the storage/transmission mode shown in FIG. 8. On the other hand, in the case of manual original changing requiring a longer changing time, the interruption time in the transmission can be reduced by continuously reading plural pages after they have been stored n the memory as explained in relation to FIG. 6.

In the foregoing example shown in FIGS. 6 to 9 it is assumed that the amount of the image data of three pages exceeds the capacity of the memory board 15, but it is naturally capable of storing three or more pages in certain cases since the quantity of image data after compression fluctuates considerably because of the characteristics of the M-H encoding.

It will be understood that the memory board 15 may be replaced by an image file, for example one utilizing an optical disk or a magnetic disk.

In the following there will be explained a receiving unit capable of receiving, either directly or through an electronic image file, the compressed image data transmitted from the original image reading unit shown in FIG. 1 and decoding said image data for printout.

Figure 10:
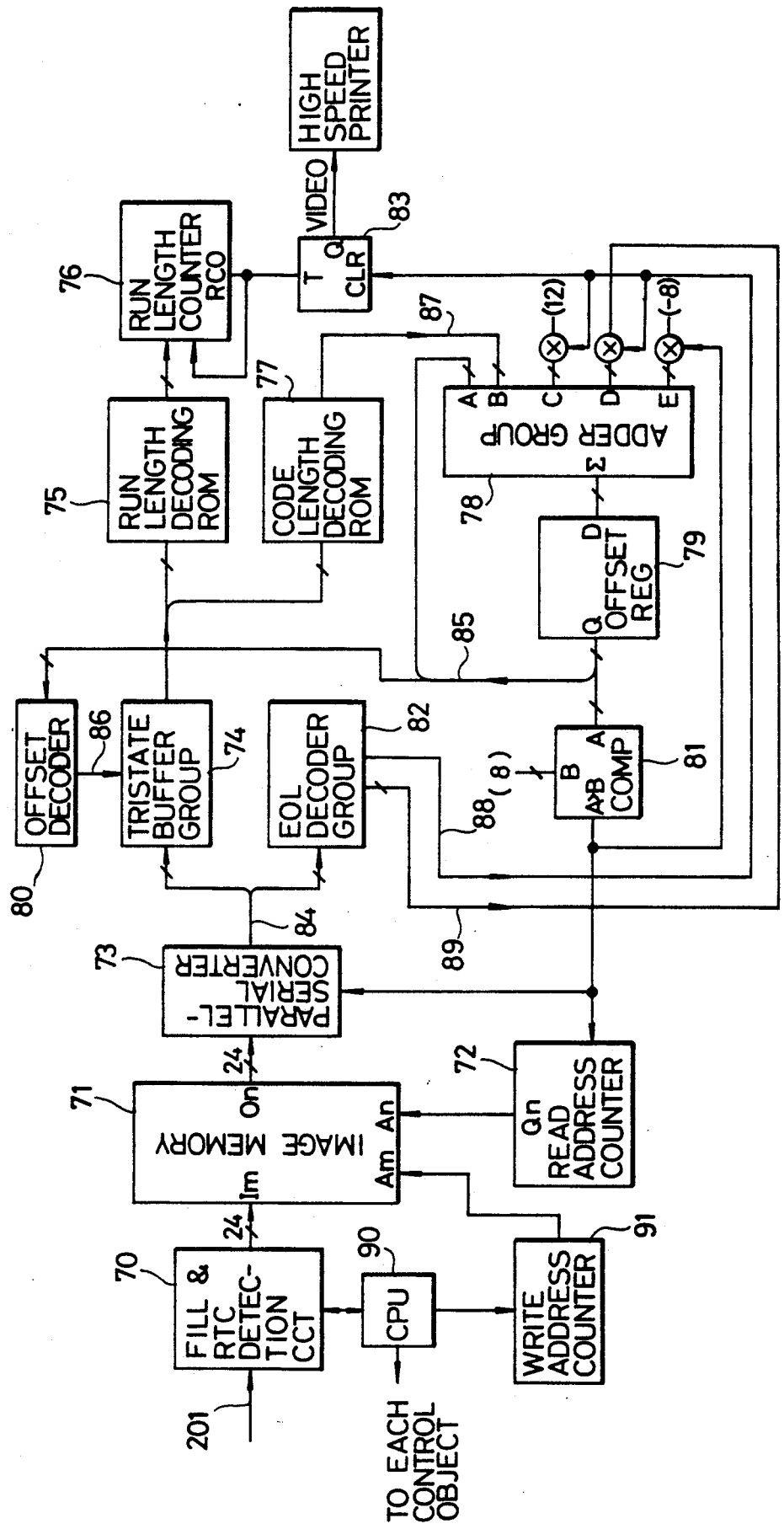
FIG. 10 is a block diagram showing an embodiment of a decoding circuit.

FIG. 10 is a schematic block diagram of an M-H decoding circuit.

The image data, compressed and M-H encoded as explained before, are supplied through a line 201. A detecting circuit 70 for detecting a FILL bit and the signal RTC in the image data supplied through the line 201 supplies a detection signal to a CPU 90, which performs the fundamental control in the present receiving unit and is composed of a microcomputer provided with ROM, RAM etc.

An image memory 71 stores the image signals which are M-H encoded in the above-described compression circuit and transmitted from the memory board 15. The image memory may be composed of an image file memory utilizing an optical disk or a magnetic disk of a capacity of at least a page. Said memory may be used to store the data transmitted from a distant location through a communication line. The M-H encoded data from said image memory are released in a form of a 24-bit parallel signal A read address counter 72 is used for providing the image memory 71 with read addresses for the data read-out. A write address counter 91 is used for providing the image memory 71 with write addresses for the data write-in.

A parallel-to-serial converter 73 is provided to divide the 24-bit parallel data, supplied from the image memory 71 through the output lines On of a 24-bit parallel structure for improving the relative speed, into three 8-bit parallel data blocks and to convert each data block into 8-bit serial signals. Said converter 73 is provided with a ternary counter 141, shown in FIG. 11, for stepwise increment of the count of the read address counter 72 at every three parallel shifts of 8-bit data. Such a structure avoids delay in time which would have been caused by successive conversion of 24-bit data into 8-bit data by means of a shift register.

A group of tristate buffers 74 is used for entering, among 24-bit data 84 from the serial-to-parallel converter 73, consecutive data of 13 bits at maximum lead by an offset value 85 indicated by an offset register 79 into a run-length decoding ROM 75 and a code-length decoding ROM 77. Said offset value indicates the extracting position of the M-H code from serial data $D_0-D_{23}$ shifted in parallel at every 8 bits, namely the junction position between neighboring M-H codes. More specifically there are employed fourteen 13-bit tristate buffers, of which input lines are connected to the signal lines 84 in stepwise displaced manner, and of which output lines form wired OR connections. Thus an arbitrary data shift can be attained by selecting one of said tristate buffers. More specifically, by enabling one of the fourteen tristate buffers for a code length, there can be instantaneously obtained M-H code data of consecutive 13 bits or less starting from a determined bit in the 24-bit data. An offset decoder 80 transfers the offset value 85 into buffer selecting signal lines 86 for selecting the above-mentioned fourteen tristate buffers. The above-described 8-bit parallel processing allows to read the M-H codes of varying lengths in simple manner at a high speed. For example, if an M-H code is composed of 3 bits, the succeeding M-H code is stored in the third next tristate buffer. Thus, by selecting said tristate buffer, the succeeding M-H code can be immediately read without a shifting of 3 bits.

The M-H code entered into the run-length decoding ROM 75 is converted therein into run-length data. The run-length decoding ROM 75 is composed of a converting table to be addressed by the M-H code and to release the corresponding run length.

The run-length data released from the ROM 75 are counted by a run-length counter 76 to provide the number of black or white bits.

A ripple carry-out signal RCO indicating the completion of the counting operation of the run-length counter 76 causes the loading of the next run-length data and inverts a toggle flip-flop 83 which releases a signal indicating whether the run-length data released from the run-length decoding ROM 75 represent white or black. There is thus obtained a a video signal, in which black bit groups and white bit groups alternate, from the output of said toggle flip-flop 83 and of the counter, and said signals is transmitted to an output device such as a printer. A code-length decoding ROM 77 is composed of a converting table to be addressed by the M-H codes in the same manner as the run-length decoding ROM 75 and to provide the effective code length of the M-H code contained in 13-bit data selectively supplied from the tristate buffers 74. Code lengths are cumulatively added in an offset register 79 through adders 78. In case the input C, D and E of the adders 78 are all "0", the original offset value 85 stored in the offset register 79 is supplied to the input A of the adders 78, while the new code length 87 is supplied to the input B. Thus, upon supply of a clock signal to the offset register, the new offset value 85 is given by:

[New offset value]=[original offset value]+ [code length].

This new value indicates the offset value of the leading end of the M-H code next to the one that has been decoded. Selection of the tristate buffers 74 according to said new offset value allows to immediately read data starting from a position shifted by the code length of the M-H code that has been decoded, thus enabling the receiver to identify the succeeding M-H code. In this manner it is rendered possible to identify the junctions of the continuously entered M-H codes of varying lengths, and thus to decode the M-H codes in succession.

The data in the parallel-to-serial converter 73 have to be replenished since the capacity thereof is limited. This is achieved, upon discrimination by a comparator 81 that the offset value 85 exceeds "8", by advancing the parallel-to-serial converter 73 by 8 bits to load new 8-bit data and by simultaneously adding "−8" to the input E of the adders 78. The new offset value in this case is given by:

[new offset value] = [original offset value] + [code length] − 8.

In this manner the offset value is shifted corresponding to the 8-bit shift of the data, so that the relative positional relationship between the data in the parallel-to-serial converter 73 and tristate buffers 74 and the offset value in the offset register 79 remains unchanged. The advance of 8 bits is conducted in the buffer, decoder and trinary counter. New 24-bit data are read from the memory 71 every time the trinary counter reaches a state "2" corresponding to three 8-bit advances. Consequently the serial data 84 in the offset register 79 look like infinitely long serial data composed of uninterrupted chains of M-H codes.

In this manner the succeeding M-H codes are taken in simultaneously with or immediately after the decoding operation of the preceding M-H code, so that the decoding operation of successive M-H codes can be realized at a high speed without interruption. Consequently the output unit, such as a printer, need not function intermittently in synchronization with the decoding operation.

An end-of-line signal EOL, which is a synchronization signal indicating the end of a line and is special data in the M-H codes, is decoded by an exclusive decoder. For this purpose there are provided EOL decoders 82 which receive 24-bit data from the parallel-to-serial converter simultaneously with the tristate buffers 74 and which are composed, as will be more detailedly explained later, of fourteen 13-bit input programmable array logics (PAL). They decode serial data respectively shifted by one bit, and upon detection of the EOL code by any of the PAL's, an EOL signal 88 is released through a 13-input OR gate. Simultaneously there is released an offset value 89 where the EOL code is detected. Upon detection of the EOL code by any of the EOL decoders 82, an EOL detection signal line 88 assumes the high-level state to reset a toggle flip-flop 83 to release white video signals for the input of a next line and to cause the adders 78 to calculate the sum of the inputs C and D, disregarding the inputs A, B and E. In this state the input C of the adders 78 is given "12" indicating the code length of the EOL code, while the input D receives the offset value 89 where the EOL code is detected. Consequently the offset value 85 is determined by:

[new offset value] = [offset value of EOL decoders] + 12.

Such EOL decoding with the exclusive decoder has the effect, in case of an error such as black-white inversion by a bit dropout in the decoding, of securely determining the end of line for confining such error within a line and preventing the remainder of the image from the effect of such failure. In the absence of error, the input B of the adders 78 indicating the code length is naturally equal to the input C at the EOL code detection, and the D indicating the offset value is equal to the sum of A and E.

In this manner the resetting of the offset register allows to exactly determine the extraction start position of the M-H code in a line next to the EOL code. Also said EOL code may be used as a horizontal synchronization signal in the recording operation of a succeeding printer.

Figure 11B:
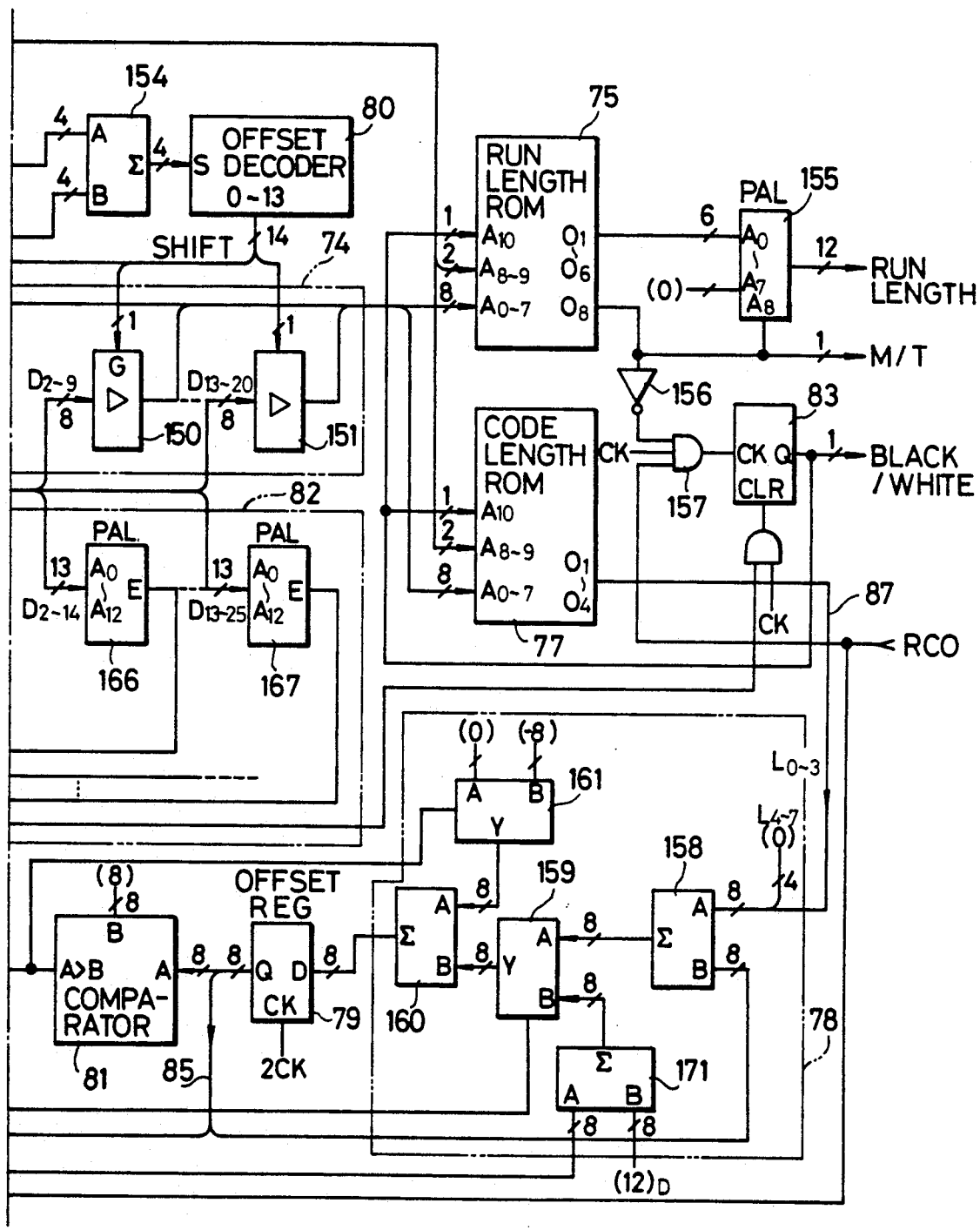
FIG. 11, composed of FIGS. 11A and 11B is a detailed circuit diagram of the circuit shown in FIG. 10.
Figures 11, 11A:
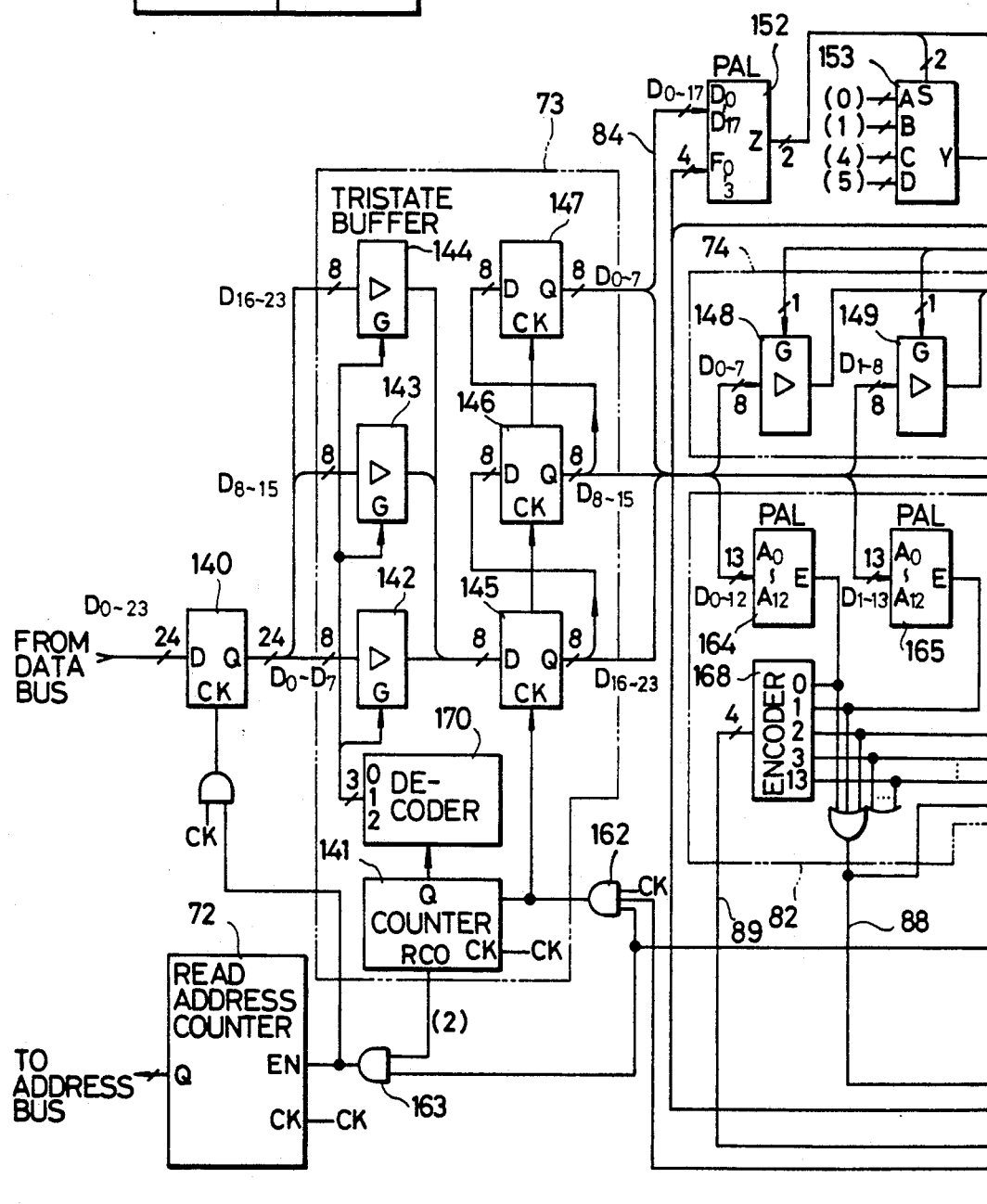

Now reference is made to FIG. 11 for explaining the structure and function of various blocks shown in FIG. 10. In FIG. 11, a symbol "⊁" indicates the presence of plural signal lines, and an accompanied figure indicates the number of such signal lines. Components same as those in FIG. 10 are represented by same numbers. CK indicates basic clock signals for process control. Parallel output signals (1 word, 24 bits $D_0$–$D_{23}$) from the unrepresented image memory are temporarily latched in a latch D140. Said latching is conducted when the ripple carry-out signal from a ternary counter 141 assumes the high-level state and the A>B output signal of a comparator 81 assumes the high-level state. The latched data $D_0$–$D_{23}$ are divided into data of consecutive 8 bits, and are supplied, through tristate buffers 142, 143, 144, to a D-latch 145 by a wired OR circuit. THe tristate buffers 142–144 are selected by the output signal of a decoder 170 to supply 8-bit data to the D-latch 145 Three-staged D-latches 145, 146, 147 for receiving and releasing 8-bit parallel data perform parallel-to-serial conversion in the form of 8-bit parallel, byte serial. The 24-bit data from the parallel-to-serial converter 73 are supplied to the tristate buffers 74, and buffers 148, 149, 150, ... respectively store 8-bit data which are stepwise displaced by one bit, such as $D_0$–$D_7$, $D_1$–$D_8$, $D_2$–$D_9$, ... Consequently by selecting either one of the buffers 148–151 constituting a tristate buffer group 4, there can be obtained data of consecutive 8 bits starting from an arbitrary bit in the serially converted output data $D_0$–$D_{23}$. For example, the selection of the tristate buffer 150 causes data $D_2$–$D_9$ to be transmitted to the run-length docoding ROM 75 and to the code-length decoding ROM 77. Since the code length of the M-H codes is 13 bits at maximum, the tristate buffers should be of a capacity of 13 bits. However, because of the characteristic of the M-H codes, they can be decoded from data of 8 bits or less if one, four or five $\phi$'s appearing at the top of a M-H code are decoded by a separate circuit, and the circuit structure can be simplified in this manner. A PAL 152 is used for decoding $\phi$'s at the top of the M-H codes. "PAL" stands for Programmable Array Logic, which is a trade name of Monolithic Memories Inc., U.S.A. For the above-mentioned purpose there may for example be employed two devices known under a name PAL18L4 with a logic shown in Table 2. It releases a 2-bit signal discriminating the presence of zero bits, which is equal to "∅" in case of absence of zero bits ("∅") from the top address indicated by the offset value of the offset register 79, "1" in the presence of at least a zero bit, "2" in the presence of four zero bits, or "3" in the presence of five zero bits. This value is supplied to a data selector 153, and also supplied, as address selecting data, to two ROM's 75, 76. In response to said discrimination signal, the data selector 153 releases [0], [1], [4] or [5] in a binary number, indicating the consecutive number of zero bits. The output signal of the data selector 153 is added with the offset value 15 in an adder 154 and is supplied to the offset decoder 80. Thus, the tristate buffers 74 release consecutive 8 bits from a buffer positioned at right corresponding to the output of the data selector 153, for example the next buffer to the right in the case of the presence of a zero bit. An output [0] of the data selector 153 indicates that the M-H code is 8 bits or less, and the addition to the offset value 85 is not conducted in such case.

The decoding of zero bits at the top of the M-H code in a separate circuit allows to reduce the capacity of tristate buffers, and also allows to reduce the address lines for the decoding ROM's.

When the accumulated code length obtained from the shift output of the buffers 74 exceeds "8", the comparator 81 identifies that the output of the offset register 79 exceeds "8", thereby activating the converting circuit 73. Thus the data in the latches 145–147 are shifted upwards by 8 bits. More specifically the data of the latch 145 are set in the latch 146, and those of the latch 146 are set in the latch 147. In this manner the data to the tristate buffers 74 are shifted by 8 bits. As explained before, the latches and the buffers are bit-to-bit connected in such a manner that the 1st to 8th bits of the latch 147 are connected to the 1st to 8th bits of the buffer 148, while the 2nd to 8th bits of the latch 147 and the 1st bit of the latch 146 are connected to the 1st to 8th bits of the buffer 149, and so on, so that the data stored in each tristate buffer can be shifted by 8 bits. As an example, 8-bit data stored in the 10th tristate buffer are also stored in the 2nd tristate buffer by said transfer operation.

The run-length ROM 75 receives the run-length code through the address lines and the run-length data through the data lines. Similarly the code-length ROM 77 receives the run-length code through the address lines and the code-length data through the data lines. More specifically the black/white signal is entered through a port $A_{10}$, the zero bit discriminating signal is entered through ports $A_8$–$A_9$, and the M-H code is entered through ports $A_0$–$A_7$. Table 3 shows an example of program to be stored in the run-length decoding ROM 75 and the code-length decoding ROM 77.

Since the run length of the make-up code is a multiple of 64, the ROM 75 stores a figure obtained by dividing the run length of the make-up code with 4, and the exact run length is obtained in a 6-bit shift circuit 155 by multiplying said figure with 64, namely by shifting the output of the ROM 75 upwards by 6 bits and releasing the lower 6 bits as zero. However, in the case of a terminate code, the shift circuit 155 does not perform said shifting operation but merely transmits the entered data. An output signal $O_8$ of the ROM 75 is used as a discrimination signal M/T for the make-up code/terminate code with a run length not exceeding 63, and said discrimination signal M/T is used for controlling whether or not to effect the shifting operation of the shift circuit 155. When the make-up code is released, a signal obtained by inverting the signal M/T with an inverter 156 disables a gate 157 thereby preventing the inversion of the toggle flip-flop 83. Said toggle flip-flop 83 is cleared by a signal 88 indicating the EOL code, thus releasing an output signal indicating "white" state. Such handling of the make-up code allows to reduce the capacity of the run-length decoding ROM 75.

The code length released from the codelength decoding ROM 77 is added with the offset value in an adder 158, and the result of said addition is supplied to the offset register 79 through a data selector 159 normally selecting the side A and an adder 160. A data selector 161 normally selects "0" but selects "−8" when the comparator 81 detects an offset value larger than 8, in which case the adder 160 subtracts 8 from the value accumulated in the past. Simultaneously a gate 162 is opened to shift the values in the latches 145, 146, 147 by 8 bits.

Also a trinary counter 141 is advanced by a step, and, if the ripple carry-out is generated the read address counter 72 is also advanced by a step. The output Q of the trinary counter 141 is supplied also to a decoder 170, which selects one of the tristate buffers 142–144 for supplying new 8-bit data to the D-latch 145 which has been emptied by the above-mentioned shifting operation.

There are provided four PAL's 164–167 for decoding the EOL code. The EOL decoding can be achieved for example with PAL16L6 according to the following logic:

$$E=/A_0*/A_1*/A_2*/A_3*/\ldots*/A_{10}*/A_{11}*/A_{12}.$$

An encoder 168 identifies which PAL decodes the EOL code. Upon detection of an EOL code, the encoder 168 identifies in which PAL said EOL code is generated, and adds "12" to the output of the encoder 168 in an adder 171 so as to shift the offset output by the data length of the EOL code, thereby regulating the offset output through the data selector 159 selecting the port B by the EOL detection signal 88.

In order to cope with zero run length there may be provided a FIFO buffer of about 2 words in the serial-to-parallel converter 73, or the clock frequency for the decoder may be doubled.

The above-mentioned procedure is applicable also to the decoding, for each color, of encoded color image data of blue, green and red, or of yellow, magenta and cyan.

As explained in the foregoing, the decoder for the M-H codes of the foregoing embodiment can decode an M-H code within a system clock time and is therefore capable of achieving a very high decoding speed. It is therefore possible to link an electronic file storing the image data in compressed form and a high-speed printer.

In M-H decoding there should be considered 13 bits. However, in the present embodiment, there is provided separate decoding for consecutive zero bits, so that the main decoder needs only to process 8 bits. For this reason the converting ROM can be 8 made inexpensive.

In addition the present embodiment is capable of preventing undesirable effect of error data over the entire image area.

TABLE 2

| Offset value | | | | Input data | | | | | | | | | | | | | | | | | | | | | | | | Output |
|---|---|---|---|---|---|---|---|---|---|---|---|---|---|---|---|---|---|---|---|---|---|---|---|---|---|---|---|---|
| $F_3$ | $F_2$ | $F_1$ | $F_0$ | $D_0$ | $D_1$ | $D_2$ | $D_3$ | $D_4$ | $D_5$ | $D_6$ | $D_7$ | $D_8$ | $D_9$ | $D_{10}$ | $D_{11}$ | $D_{12}$ | $D_{13}$ | $D_{14}$ | $D_{15}$ | $D_{16}$ | $D_{17}$ | $D_{18}$ | $D_{19}$ | $D_{20}$ | $D_{21}$ | $D_{22}$ | $D_{23}$ | |
| ø | ø | ø | ø | 1 | | | | | | | | | | | | | | | | | | | | | | | | 0 |
| ø | ø | ø | ø | ø | 1 | | | | | | | | | | | | | | | | | | | | | | | 1 |
| ø | ø | ø | 1 | ø | ø | ø | ø | 1 | | | | | | | | | | | | | | | | | | | | 2 |
| ø | ø | ø | 1 | ø | ø | ø | ø | ø | | | | | | | | | | | | | | | | | | | | 3 |
| ø | ø | ø | ø | ø | 1 | ø | ø | ø | | | | | | | | | | | | | | | | | | | | 0 |
| ø | ø | ø | ø | ø | ø | | | | | | | | | | | | | | | | | | | | | | | 1 |
| ø | ø | ø | 1 | ø | ø | ø | ø | 1 | | | | | | | | | | | | | | | | | | | | 2 |
| ø | ø | ø | 1 | ø | ø | ø | ø | ø | | | | | | | | | | | | | | | | | | | | 3 |
| 1 | | | 1 | | | | | | | | | | | | | 1 | | | | | | | | | | | | 0 |
| 1 | ø | ø | 1 | | | | | | | | | | | | | ø | | | | | | | | | | | | 1 |
| | | | | | | | | | | | | | | ø | ø | ø | 1 | | | | | | | | | | | 2 |
| | | | | | | | | | | | | | | ø | ø | ø | ø | | | | | | | | | | | 3 |

TABLE 3

| | | | | Input | | | | | | | Output Run length | M/T | Code length | |
|---|---|---|---|---|---|---|---|---|---|---|---|---|---|---|
| $A_{10}$ | $A_9$ | $A_8$ | $A_7$ | $A_6$ | $A_5$ | $A_4$ | $A_3$ | $A_2$ | $A_1$ | $A_0$ | | | | |
| 0 | 0 | 1 | 0 | 1 | 1 | 0 | 1 | 0 | 1 | | 0 | 0 | 8 | |
| 0 | 0 | 1 | 0 | 0 | 1 | 1 | 1 | | | | 1 | 0 | 6 | |
| 0 | 0 | 1 | 1 | 1 | 1 | | | | | | 2 | 0 | 4 | |
| 0 | 0 | 0 | 1 | 0 | 0 | 0 | | | | | 3 | 0 | 4 | |
| 0 | 0 | 0 | 1 | 0 | 0 | 1 | | | | | 4 | 0 | 4 | |
| 0 | 0 | 0 | 1 | 1 | 0 | 0 | | | | | 5 | 0 | 4 | |
| 0 | 1 | 1 | 1 | 0 | 0 | | | | | | 45 | 0 | 8 | |
| 0 | 1 | 1 | 1 | 0 | 1 | | | | | | 46 | 0 | 8 | |
| 0 | 0 | 0 | 1 | 1 | 0 | 1 | 1 | | | | 1 | 1 | 5 | |
| 0 | 0 | 1 | 1 | 0 | 1 | 1 | 1 | | | | 3 | 1 | 6 | |
| 0 | 0 | 1 | 1 | 1 | 0 | 1 | 0 | 1 | 0 | 1 | 16 | 1 | 9 | |
| x | 1 | 1 | 0 | 0 | 0 | 0 | 0 | 0 | 1 | | 0 | 1 | 12 | EOL |
| x | 1 | 1 | 0 | 0 | 1 | 1 | 1 | 1 | 1 | | 40 | 1 | 12 | |
| 1 | 1 | 0 | 1 | 1 | 0 | 1 | 1 | 1 | | | 0 | 0 | 10 | |
| 1 | 0 | 1 | 1 | 0 | | | | | | | 1 | 0 | 3 | |
| 1 | 0 | 0 | 1 | 1 | | | | | | | 2 | 0 | 2 | |
| 1 | 0 | 0 | 1 | 0 | | | | | | | 3 | 0 | 2 | |
| 1 | 0 | 1 | 1 | 1 | | | | | | | 4 | 0 | 3 | |
| 1 | 0 | 1 | 0 | 1 | 1 | | | | | | 5 | 0 | 4 | |
| 1 | 1 | 1 | 1 | 1 | 0 | 0 | 1 | 0 | 0 | | 48 | 0 | 12 | |

Figure 12:
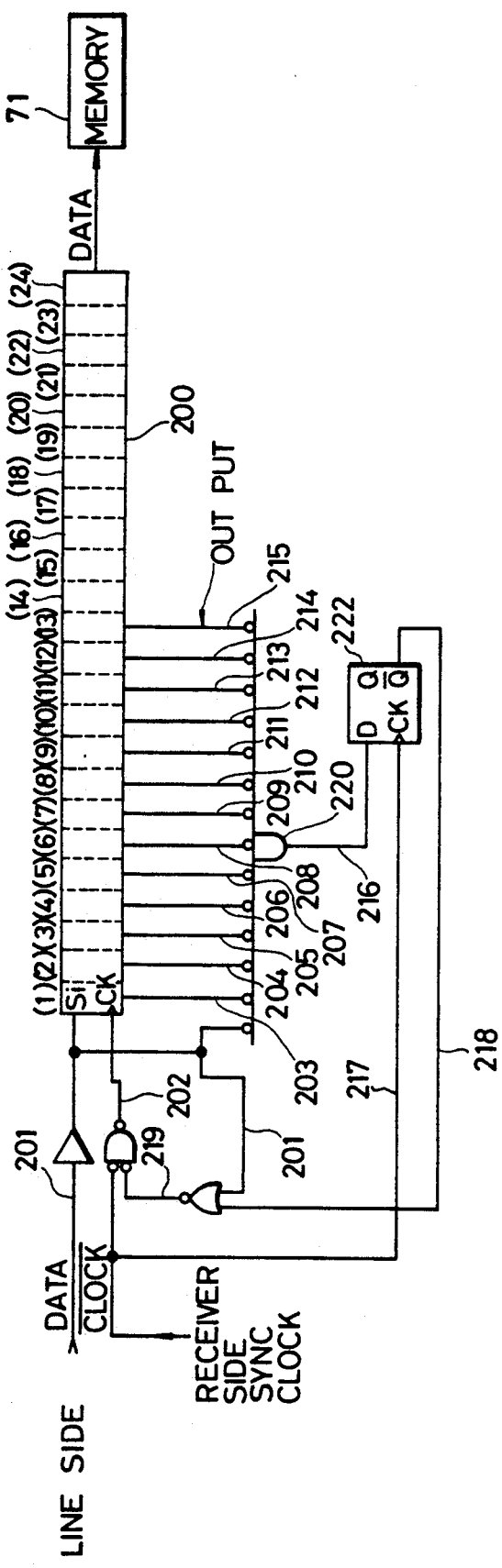
FIGS. 12 and 14 are circuit diagrams showing circuits for detecting particular data.
Figure 13:
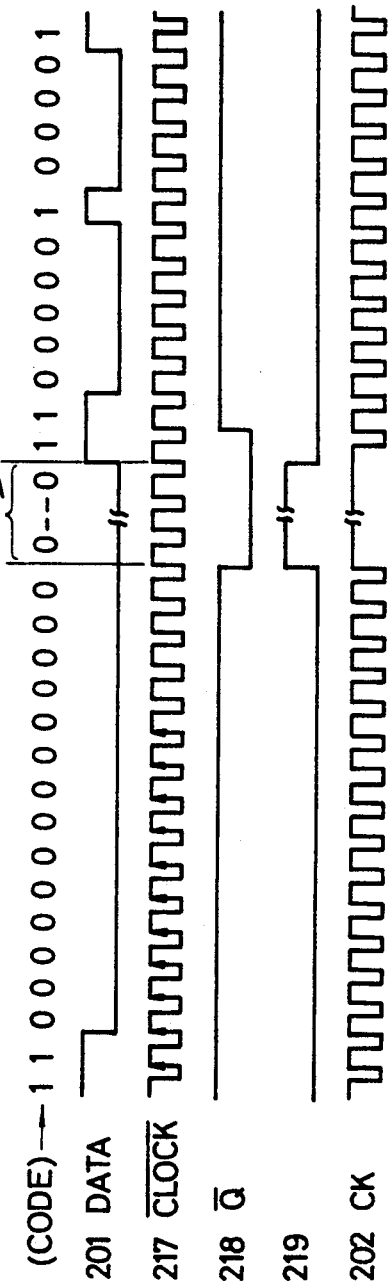
FIGS. 13, 15 and 16 are corresponding timing charts.

Now reference is made to FIGS. 12 and 13 for explaining the detection of FILL bit by the FILL/RTC detection circuit 70 shown in FIG. 1 to prevent the storage of said FILL bit into the memory 71.

In order to prevent a situation in which the printer cannot follow the encoded data when they are extremely short, FILL bits are included in the run-length code of the M-H encoded code for the purpose of expanding the quantity of data. Such FILL bits, being not actual image data, are detected at the reception and excluded from the storage into the memory 71 in order to prevent waste of the memory capacity.

In the M-H code system, the maximum number of consecutive zero bits is 14, excluding such FILL bits. Consequently, if the data contains consecutive zero bits in excess of 14 bits, the 15th and ensuing zero bits are FILL bits. Thus, upon detection of 14 consecutive zero bits, any ensuing zero bits are identified as FILL bits and the storage into a shift register 200 until a bit "1" appears. The storage of the FILL bits into the memory 71 can be prevented, therefore, by transferring the content of said shift register 200 into the memory 71.

FIG. 12 shows a circuit for FILL bit detection in the FILL/RTC detection circuit 70.

The register 200 is for example composed of a 24-bit serial-in-parallel-out register and is connected with the memory 71. There are also shown a signal line 201 for transmitted and encoded data; data clock signals 202 formed in the receiving unit in synchronization with the data; output signals 203-215 of the shift register; a FILL detection signal line 216; a FILL bit detector 220; a write clock inhibition signal 219; a D-type flip-flop 222; and write clock signals 217 for the shift register 217. These signals are shown in a time chart shown in FIG. 13.

In the case the 14th bit of the data stored in the register is "1", said bit is an effective data so that the following bits are identified effective and the storage thereof into the register 200 and in the memory 71 is enabled. On the other hand, if the 14th bit is also "0", the detection signal line 216 releases a signal "1" to set the flip-flop 222, thereby blocking the following data clock signals, thus inhibiting the storage of the FILL bits into the register 200. Then, if the 15th bit is still "0" said inhibition continues, but, if the 15th bit is "1" the inhibition of the data clock signals is cancelled.

In the case of decoding the data by reading, from the memory 71, the data from which the FILL bits have been excluded as explained above, it may become necessary to add the FILL bits depending on the function of the printer or display designed for handling decoded image data. In such a case it is possible to follow the decoding speed or the printing speed by including the FILL bits again at the data read-out from the memory 71. As an example, in the case that there are required at least 500 bits between the EOL signals in consideration of the printer speed while the M-H codes read from the memory 71 contain only 300 bits, there are added 200 "0" bits. This is achieved in fact by detecting the number of bits between the EOL signals and adding "0" bits by a necessary number.

Now there will be given an explanation of the detection of End-of-Line code, or an M-H code "000000000001" at the reception, the detection of RTC (return to control) signal or 2×EOL, and the control achieved by said detecting operations.

Figure 14:
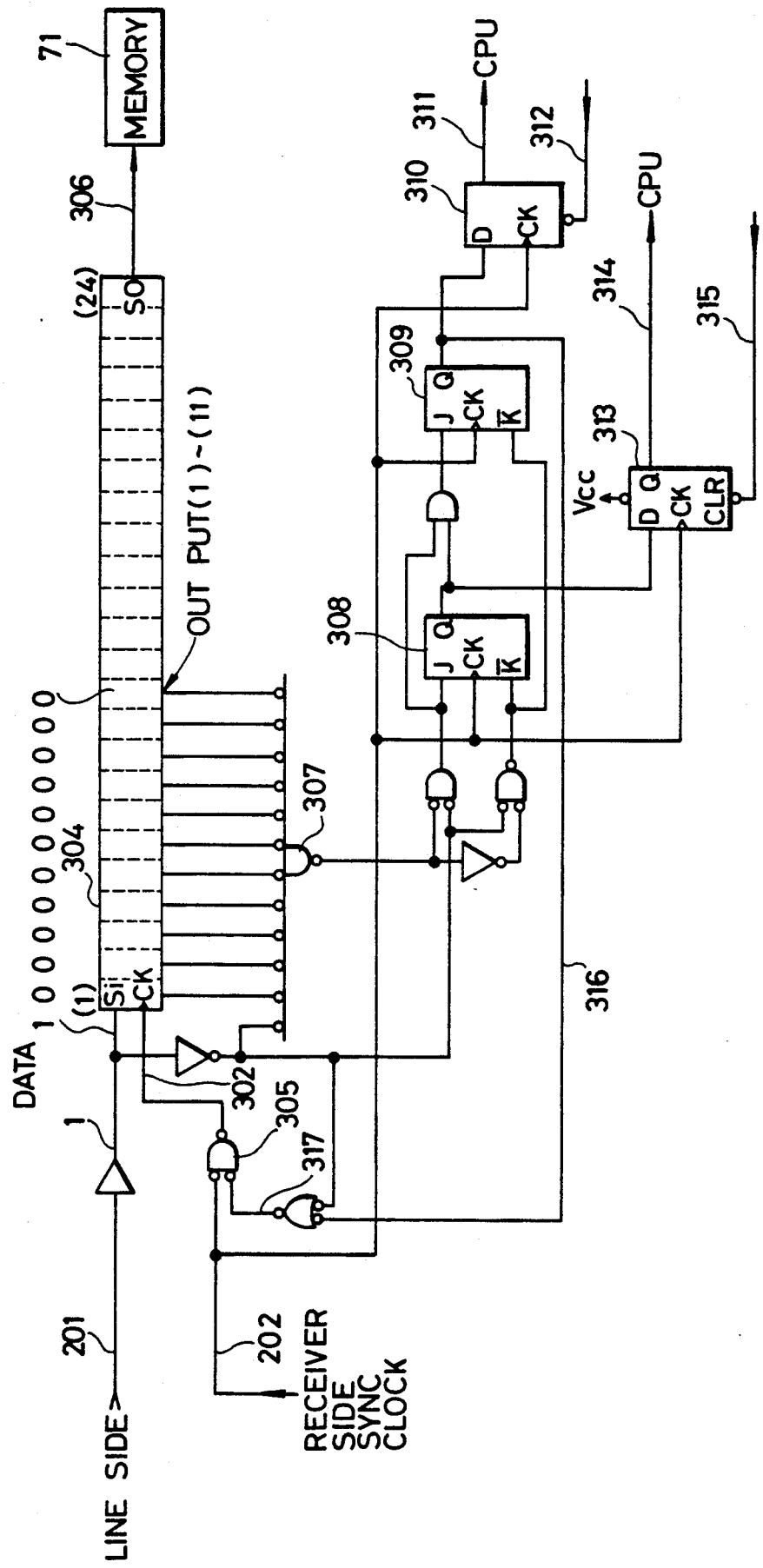
Figure 15:
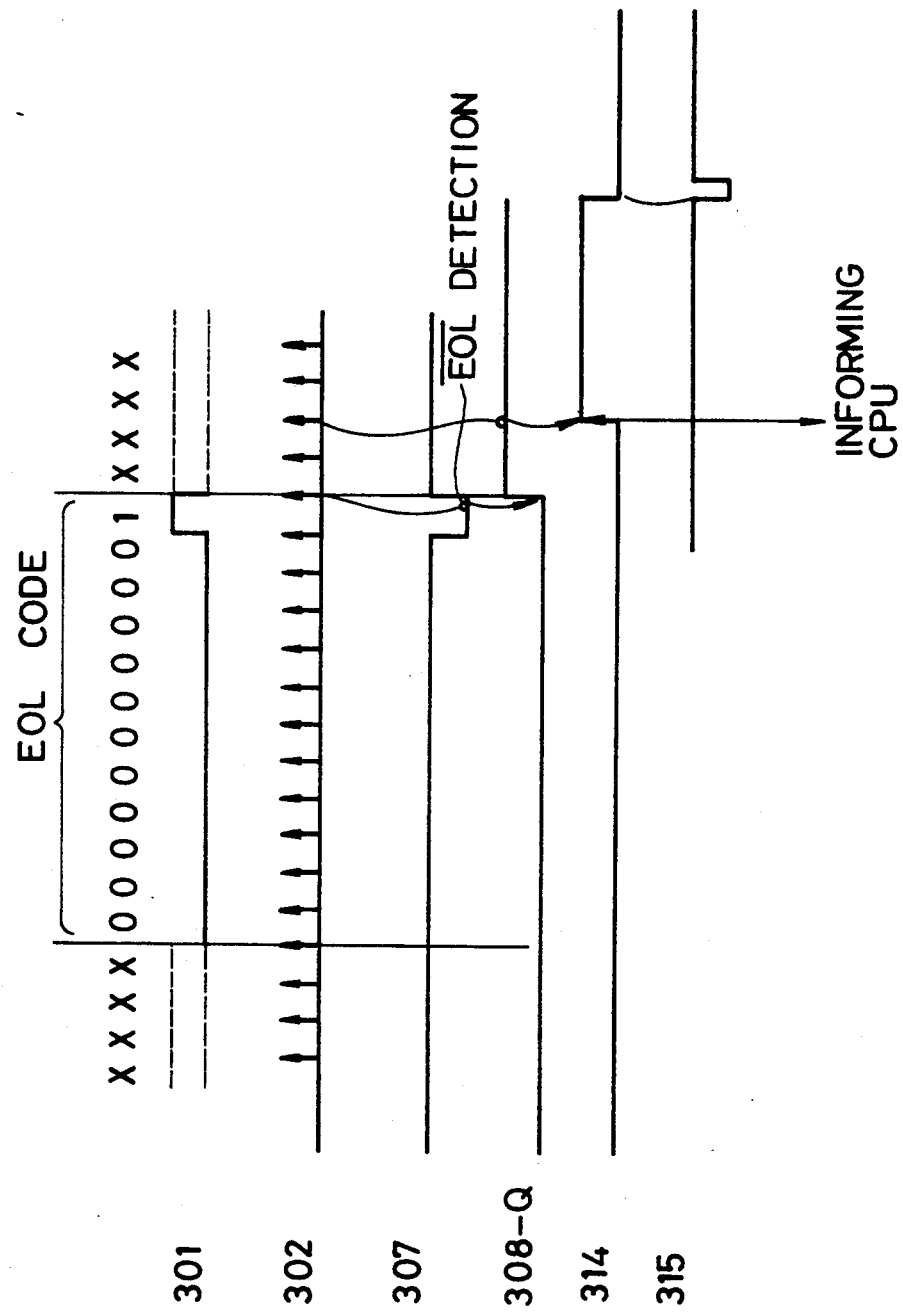
Figure 16:
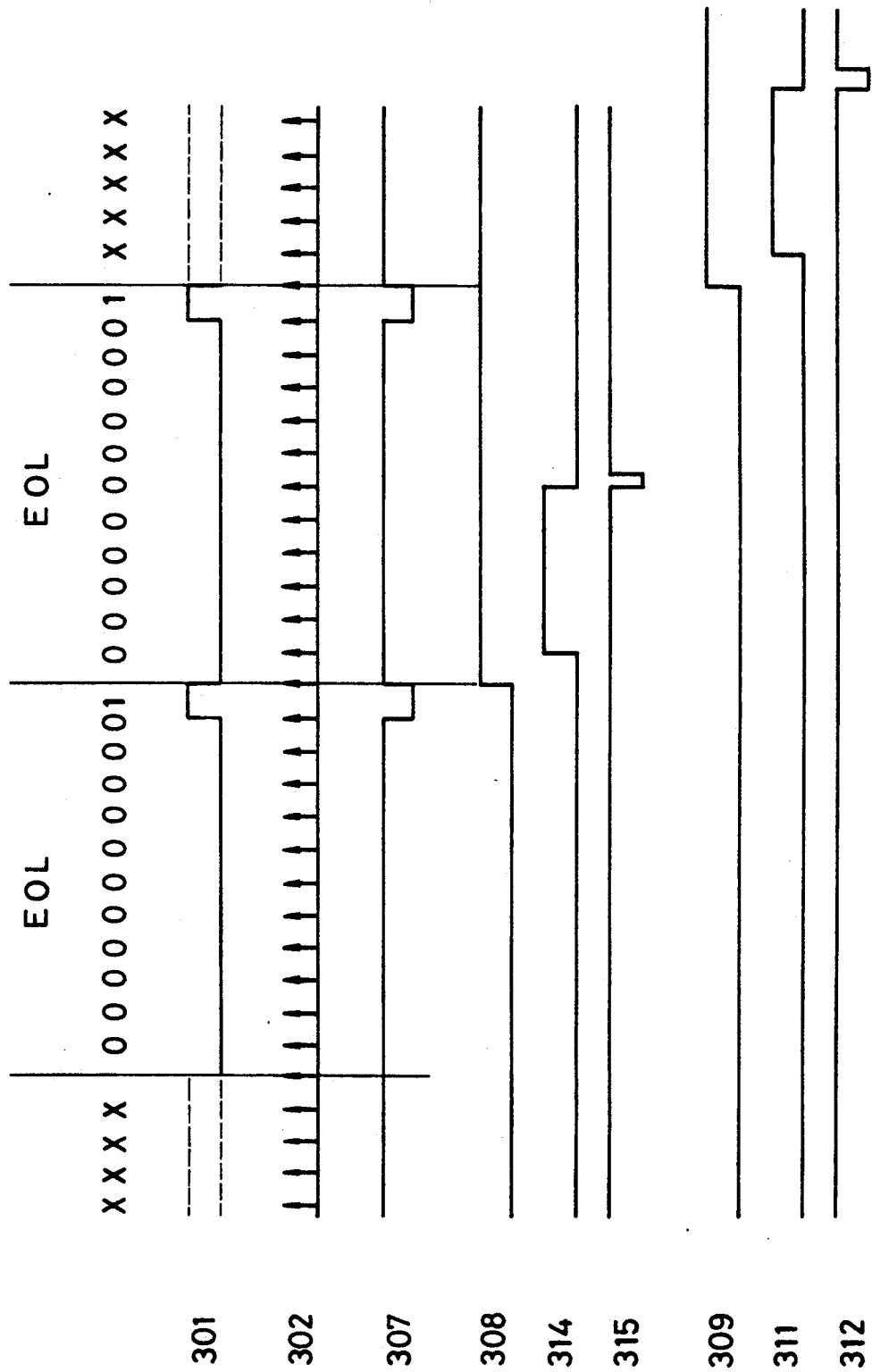

FIG. 14 shows a circuit for the above-mentioned purpose, and FIGS. 15 and 16 are timing charts indicating the signal status. The image data received through a common communication line are serial data, and include an EOL signal for each scan line in case said data are M-H compressed. Said EOL signal is detected and transmitted to the CPU 90, which inspects the interval of said EOL signals to detect any abnormality in the communication line or in the reception state.

Two or more EOL signals, if detected consecutively, are identified as an RTC signal indicating a page end or an interruption in the received data, and said detection is transmitted to the CPU 90 to terminate the data storage into the memory 71. Also the data after said RTC signal detection are not received.

Lines 201, 202 are similar to those shown in FIG. 12. A shift register 304 is similar to the shift register 200 and in fact is composed of the same shift register as shown in FIG. 12, though they are numbered differently for the ease of explanation. There are also shown a control gate 305 for data storage clock signals; an EOL detector 307; flip-flops 308, 313 for storing the detection signal, wherein the flip-flop 313 is used as an interface for the CPU 90; an EOL recognizing signal 315 from the CPU 90; flip-flops 309, 310 for detecting and storing the RTC signal, wherein the flip-flop 310 is used as an interface for the CPU 90; an EOL recognizing signal 312 from the CPU 90; an $\overline{RTC}$ signal 316; and a signal 317 for forbidding the data write-in to the register after the RTC signal. Eleven "0" bits followed by a "1" bit in the input signals to the register 304 are identified as an EOL signal by the detector 307, which transmits this information to the CPU 90 by setting the flip-flops 308, 313. Utilizing the output signals of the flip-flop 313, the CPU 90 measures the interval between the EOL signals with a timer to inspect for an error. Two consecutive EOL signals set the flip-flops 309, 310, whereupon the CPU 90 identifies the entry of the RTC signal and stores the address data of the memory 71 at this point in an internal RAM, so that the data storage of a next page is started from said address. At the same time the gate 305 is controlled to inhibit the ensuing data storage in the memory 71.

Also, at the start of transmission, the data storage into the memory is inhibited unless an EOL signal is firstly detected in the received data. This procedure avoids the inconvenience of storing noise data into the memory 71.

Stated otherwise, the start of page data is confirmed and the data storage in the memory 71 is started only after the CPU detects the reception of EOL signal through the flip-flop 313.

The memory 71 of a capacity of 32 Mbyte can ordinarily store data of about 16 pages each containing information of about 2 Mbytes, but may only be able to store about 2 pages in case the information contained therein is complicated. Consequently the memory control by the above-explained EOL and RTC signals enables effective utilization of the memory.

FIGS. 15 and 16 are timing charts for detecting the EOL and RTC signals.

Also, in the case of reading the encoded data from the memory 71 for decoding as explained before or for transmission through a communication line, such decoding or transmission is enabled only if an EOL signal is at first detected. This procedure prevents the transmission of noise data, and can be achieved by a circuit similar to that shown in FIG. 14, wherein the memory 71 and the communication line are interchanged.

In the foregoing the received compressed data are utilized for printout, but they may also be utilized for display or filing.

The present invention is not limited to the foregoing embodiments but is naturally subject to various modifications and variations within the scope and spirit of the appended claims.

What is claimed is:
1. An image processing apparatus comprising:
means for sequentially reading a plurality of pages of original images and sequentially generating image data representing each of the original images;
means for compressing the image data so as to form compressed image data, the amount of a page of compressed image data being variable;
memory means capable of storing a plurality of such pages of compressed image data; and
control means for controlling the reading operation of said reading means and the storage operation of said memory means in such a manner that compressed image data of a succeeding page is stored in a memory area following the memory area in which the compressed image data of a preceding page is stored,
wherein said control means is adapted to interrupt storage of the compressed image data into said memory means in a case in which said memory means becomes unavailable for the storage of the compressed image data in the course of the storage of a page of the compressed image data, and wherein said control means causes reading of the same page of original image to be performed again and causes the storage of the compressed image data of the same page in the same memory area to be performed again when said memory means becomes available for the storage of the compressed image data.

2. An image processing apparatus according to claim 1, wherein said control means is adapted to determine a memory start address for the storage of the compressed image data of the succeeding page according to a memory end address of the compressed image data of the preceding page in such memory means.

3. An image processing apparatus according to claim 1, wherein said read out of compressed image data from one area of the memory can be performed simultaneously with image data storage in another area.

4. An image processing apparatus according to claim 1, the arrangement being such that when image data has been stored in the whole of the memory, further image data can be stored in an area of the memory if image data previously stored in that area has been read out therefrom.

5. An image processing apparatus according to claim 1, wherein said control means is adapted to inhibit the storage of the compressed image data into an area of said memory means in which compressed image data are already stored.

6. An image processing apparatus according to claim 1, wherein the read-out of compressed image data from said memory means is conducted in the order of storage into said memory means.

7. An image processing apparatus according to claim 1, wherein said control means is adapted to interrupt the storage of the compressed image data in the case of an overflow in said memory means in the course of image data storage.

8. An image processing apparatus comprising:
means for entering data containing compressed image data representing an original image, delimiter data representing delimitation of a line of the compressed image data, and dummy data added between the compressed image data and the delimiter data for adjustment of data quantity between the delimiter data;
memory means for storing compressed image data;
first detecting means for detecting said dummy data contained in the entered data;
second detecting means for detecting said delimiter data contained in the entered data; and control means for controlling the storage operation of said memory means, wherein said control means inhibits the data storage into said memory means in accordance with a detection signal from said first detecting means, and enables the data storage in said memory means in accordance with a detection signal from said second detecting means, so that said memory means stores the compressed image data contained in the data entered by said entering means.

9. An image processing apparatus according to claim 8, wherein said first detecting means is adapted to detect the dummy data from the state of continuation of predetermined signals.

10. An image processing apparatus according to claim 8, wherein said entering means is adapted to enter compressed image data obtained by compressing image data which are obtained by photoelectrically reading an original image.

11. An image processing apparatus according to claim 8, wherein said control means enables the data storage after the detection of said delimiter data into said memory means.

12. An image processing apparatus according to claim 8, wherein said memory means is adapted to store a plurality of pages of compressed image data.

13. An image processing apparatus according to claim 8, wherein continuation of said delimiter data represents completion of entry of a page of the image data.

14. A image processing apparatus comprising:
means for sequentially generating image data representing a plurality of pages of original images;
means for compressing the image data to form compressed image data, the amount of a page of compressed image data being variable;
memory means capable of storing a plurality of such pages of compressed image data; and
control means for controlling storage operation of said memory means in such a manner that compressed image data of a succeeding page is stored in a memory area following the memory area in which the compressed image data of a preceding page is stored, wherein said control means is adapted to interrupt storage of the compressed image in said memory means in a case in which said memory means becomes unavailable for storage of the compressed image data in the course of the storage of a page of the compressed image data, and thereafter said control means causes the storage of the compressed image data in said memory means to be performed when said memory means becomes available for the storage of the compressed image data.

15. An image processing apparatus according to claim 14, wherein said control means is adapted to determine a memory start address for the storage of the compressed image data of the succeeding page according to a memory end address of the compressed image data of the preceding page in such memory means.

16. An image processing apparatus according to claim 14, wherein read-out of compressed image data from one area of said memory means can be performed simultaneously with image data storage in another area of said memory means.

17. An image processing apparatus according to claim 14, wherein, when image data has been stored in all of said memory means, further image data can be stored in an area of said memory means once image data previously stored in that area has been read out therefrom.

18. An image processing apparatus according to claim 14, wherein said control means is adapted to inhibit storage of the compressed image data into an area of said memory means in which compressed image data are already stored.

19. An image processing apparatus according to claim 14, wherein read-out of compressed image data from said memory means is conducted in the order of storage into said memory means.

20. An image processing apparatus according to claim 14, wherein said control means is adapted to interrupt storage of the compressed image data in the case of an overflow in said memory means in the course of image data storage.

* * * * *

UNITED STATES PATENT AND TRADEMARK OFFICE
CERTIFICATE OF CORRECTION

PATENT NO. : 5,022,088                                    Page 1 of 5
DATED      : June 4, 1991
INVENTOR(S): Katsutoshi Hisada It is certified that error appears in the above-indentified patent and that said Letters Patent is hereby corrected as shown below:

On the title page, Item

[56] REFERENCES CITED

U.S. PATENT DOCUMENTS, "4,410,916  10/1953  Pratt et al." should read --4,410,916  10/1983  Pratt et al.--.

Attorney, Agent, or Firm: Fitzpatrick, Cella Harper & Scinto" should read --Fitzpatrick, Cella, Harper & Scinto--.

COLUMNS 5-22

Columns 5 to 22 are out of order.

COLUMN 1

Line 22, "has" should read --has already--.
    Line 32, "adjustment" should read --adjustment of--.
    Line 40, "However" should read --However, such--.

COLUMN 2

Line 26, "11B" should read --11B,--.

COLUMN 3

Line 18, "and" should read --which are--.
    Line 23, "and" should read --and it--.
    Line 24, "an" should be deleted.
    Line 58, ""001138," should read --"0011",--.
    Line 59, "0011XXXXXXXX" should read --"0011XXXXXXXX"--.

UNITED STATES PATENT AND TRADEMARK OFFICE
CERTIFICATE OF CORRECTION

PATENT NO.   : 5,022,088
DATED        : June 4, 1991
INVENTOR(S)  : Katsutoshi Hisada It is certified that error appears in the above-indentified patent and that said Letters Patent is hereby corrected as shown below:

COLUMN 4

Line 6, "jointing" should read --joining--.
    Line 15, "the" should read --for--.
    Line 18, "13-bit-register" should read --13-bit register--.
    Line 41, "A" should read --The--.

COLUMN 5

Line 19, "over-signal" should read --overflow signal--.
    Line 28, "H)" should be deleted.
    Line 68, "of" should be deleted.

COLUMN 6

Line 18, "dithertreated" should read --dither-treated--.
    Line 21, "an" should be deleted.
    Line 49, "memory 15" should read --memory board 15--.

COLUMN 7

Line 66, "Selectors 62-66" should read --Selectors 62-64--.

COLUMN 8

Line 9, "on" should read --or--.
    TABLE 1, "It is designated by" should read --It is designated by CPU.--.
    Line 67, "H)" should be deleted.

UNITED STATES PATENT AND TRADEMARK OFFICE
CERTIFICATE OF CORRECTION

PATENT NO. : 5,022,088
DATED : June 4, 1991
INVENTOR(S) : Katsutoshi Hisada

It is certified that error appears in the above-indentified patent and that said Letters Patent is hereby corrected as shown below:

COLUMN 10

Line 14, "latch 2" should read --latch 52--.
    Line 21, "(c)" should read --(C)--.
    Line 28, "(a)" should read (A)--.
    Line 44, "In this the" should read --The--.

COLUMN 11

Line 1, "hand" should read --hand,--.
    Line 19, "n" should read --in--.
    Line 29, "example" should read --example,--.
    Line 54, "a" (first occurrence) should read --the--.
    Line 55, "signal" should read --signal.--.

COLUMN 12

Line 23, "value 85" should read --value-- and "lines 86" should read --lines--.
    Line 46, "a" (second occurrence) should be deleted.
    Line 48, "output" should read --outputs--.
    Line 49, "signals" should read --signal--.

COLUMN 13

Line 29, "trinary" should read --ternary--.
    Line 61, "given" should read --set to--.

UNITED STATES PATENT AND TRADEMARK OFFICE
CERTIFICATE OF CORRECTION

PATENT NO. : 5,022,088

DATED : June 4, 1991

INVENTOR(S) : Katsutoshi Hisada

It is certified that error appears in the above-indentified patent and that said Letters Patent is hereby corrected as shown below:

COLUMN 14

Line 19, "fIG." should read --FIG.--.
Line 33, "THe" should read --The--.
Line 35, "D-latch 145" should read --D-latch 145.--.
Line 44, "group 4," should read --group 74,--.
Line 49, "docoding" should read --decoding--.

COLUMN 15

Line 7, "value 15" should read --value 85--.
Line 51, "with 4," should read --with 64,--.

COLUMN 16

Line 7, "codelength" should read --code-length--.
Line 18, "trinary" should read --ternary--.
Line 21, "trinary" should read --ternary--.
Line 61, "8" should be deleted.
Line 63, "effect" should read --effects--.

COLUMN 19

Line 47, "the storage" should read --stored--.
Line 61, "register 217." should read --register 200.--.

UNITED STATES PATENT AND TRADEMARK OFFICE
CERTIFICATE OF CORRECTION

PATENT NO. : 5,022,088
DATED : June 4, 1991
INVENTOR(S) : Katsutoshi Hisada

It is certified that error appears in the above-indentified patent and that said Letters Patent is hereby corrected as shown below:

COLUMN 19

Line 64, "case" should read --case where--.

Signed and Sealed this

Fourteenth Day of June, 1994

BRUCE LEHMAN

*Attest:*

*Attesting Officer*     *Commissioner of Patents and Trademarks*